United States Patent
Murakami et al.

(10) Patent No.: US 7,248,385 B2
(45) Date of Patent: Jul. 24, 2007

(54) PRINTER CONTROLLER THAT HAS A PRINTER PERFORM PRINT PROCESSING ON PRINT JOBS TRANSMITTED FROM A PLURALITY OF TERMINALS, AN IMAGE FORMING APPARATUS FOR PERFORMING PRINT PROCESSING ON THE PLURALITY OF PRINT JOBS, AND A TERMINAL THAT TRANSMITS PRINT JOBS TO THE PRINTER CONTROLLER

(75) Inventors: Hiroshi Murakami, Toyokawa (JP); Masaya Hirota, Toyohashi (JP); Tomo Tsuboi, Toyokawa (JP); Takeshi Morikawa, Okazaki (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 1258 days.

(21) Appl. No.: 09/758,361

(22) Filed: Jan. 12, 2001

(65) Prior Publication Data

US 2001/0038461 A1 Nov. 8, 2001

(30) Foreign Application Priority Data

| Jan. 18, 2000 | (JP) | ............................. 2000-008807 |
| Jan. 18, 2000 | (JP) | ............................. 2000-008808 |
| Jan. 19, 2000 | (JP) | ............................. 2000-010832 |

(51) Int. Cl.
*G06K 15/00* (2006.01)

(52) U.S. Cl. ..................................... 358/1.18; 358/1.12

(58) Field of Classification Search ............... 358/1.12, 358/1.15, 1.13, 1.16, 403, 468, 1.18, 1.14; 399/82

See application file for complete search history.

(56) References Cited

U.S. PATENT DOCUMENTS

| 4,797,706 | A | * | 1/1989 | Sugishima et al. | ......... 358/300 |
| 5,696,702 | A | * | 12/1997 | Skinner et al. | ............. 702/186 |
| 5,748,337 | A | * | 5/1998 | Minamizawa | ............... 358/468 |
| 5,847,726 | A | * | 12/1998 | Hori | ........................... 347/23 |
| 5,940,582 | A | * | 8/1999 | Akabori et al. | ............. 358/1.13 |
| 6,026,258 | A | * | 2/2000 | Fresk et al. | .................... 399/87 |
| 6,137,587 | A | * | 10/2000 | Muto et al. | ................. 358/1.15 |
| 6,138,155 | A | * | 10/2000 | Davis et al. | ................ 709/224 |
| 6,184,996 | B1 | * | 2/2001 | Gase | ......................... 358/1.15 |

(Continued)

FOREIGN PATENT DOCUMENTS

JP 06251035 * 9/1994

(Continued)

OTHER PUBLICATIONS

JP 09054664; Feb. 25, 1997; Japan; Aihara Satoshi; G06F 3/12; English Translation.*

*Primary Examiner*—Jerome Grant
(74) *Attorney, Agent, or Firm*—Buchanan Ingersoll & Rooney PC

(57) ABSTRACT

A printer server is connected to a plurality of terminals. The printer server includes a terminal status detecting unit that receives a piece of operation information 'key' indicating that a operation has been performed from each terminal, measures an elapsed time since each piece of operation information 'key' was received by referring to a timer, and sets a non-operational status 'status' for each terminal according to the length of the elapsed time, a priority determining unit that determines a priority level from the non-operational status 'status', and a print job processing unit that has print job processing performed by, when a plurality of print jobs are waiting to be processed, giving preference to print jobs transmitted from terminals with higher priority levels.

27 Claims, 34 Drawing Sheets

U.S. PATENT DOCUMENTS

| | | | |
|---|---|---|---|
| 6,234,604 B1 * | 5/2001 | Kawakami et al. | 347/23 |
| 6,249,658 B1 * | 6/2001 | Inui et al. | 399/82 |
| 6,497,469 B1 * | 12/2002 | Shinada et al. | 347/19 |
| 6,606,163 B1 * | 8/2003 | Suzuki et al. | 358/1.15 |
| 6,867,873 B1 * | 3/2005 | Han | 358/1.12 |
| 6,897,972 B1 * | 5/2005 | Noda | 358/1.15 |
| 6,952,280 B1 * | 10/2005 | Tanimoto | 358/1.15 |
| 7,016,063 B2 * | 3/2006 | Hama | 358/1.15 |
| 2002/0051171 A1 * | 5/2002 | Hama | 358/1.15 |
| 2002/0099812 A1 * | 7/2002 | Davis et al. | 709/224 |

FOREIGN PATENT DOCUMENTS

| | | | |
|---|---|---|---|
| JP | 07-246756 | | 9/1995 |
| JP | 08-106369 A | | 4/1996 |
| JP | 08-258365 | | 10/1996 |
| JP | 9016354 | * | 1/1997 |
| JP | 09-054664 | | 2/1997 |
| JP | 10-100512 | | 4/1998 |
| JP | 10-157249 A | | 6/1998 |
| JP | 11-091210 | | 4/1999 |
| JP | 11-119940 A | | 4/1999 |

* cited by examiner

FIG. 4

| BUFFER NO. | FLAG (ON/OFF) | PRINT JOB | TERMINAL NO. (p) | RECEPTION TIME (tr) | PRIORITY LEVEL (priority) |
|---|---|---|---|---|---|
| 1 | | | | | |
| 2 | | | | | |
| 3 | | | | | |
| n | | | | | |
| N | | | | | |

PRINT JOB BUFFER 431

FIG. 5

STATUS STORAGE TABLE441

| TERMINAL NO. | RECEPTION TIME (tl) | EXPIRED TIME (tk) | STATUS |
|---|---|---|---|
| 1 | | | |
| 2 | | | |
| 3 | | | |
| p | | | |
| P | | | |

FIG. 10

STATUS STORAGE TABLE 621

| | |
|---|---|
| RECEPTION TIME (tl) | |
| EXPIRED TIME (tk) | |
| STATUS | |

FIG. 11

PRINT JOB BUFFER 631

| BUFFER NO. | FLAG (ON/OFF) | PRINT JOB | RECEPTION TIME (tr) |
|---|---|---|---|
| 1 | | | |
| 2 | | | |
| 3 | | | |
| n | | | |
| N | | | |

FIG. 16

PRIORITY STORAGE TABLE 131A

| TERMINAL NO. | RECEPTION TIME (tl) | EXPIRED TIME (tk) | PRIORITY LEVEL (priority) |
|---|---|---|---|
| 1 | | | |
| 2 | | | |
| 3 | | | |
| p | | | |
| P | | | |

FIG. 25

| BUFFER NO. n | JOB BODY J[n] | TRANSMISSION TERMINAL NO. U[n] | JOB RECEPTION TIME tr[n] | FLAG f[n] | PRIORITY LEVEL Pz[n] |
|---|---|---|---|---|---|
| 1 | | | | | |
| 2 | | | | | |
| 3 | ----- | | | | |
| N | | | | | |

421B

PRINTER CONTROLLER THAT HAS A PRINTER PERFORM PRINT PROCESSING ON PRINT JOBS TRANSMITTED FROM A PLURALITY OF TERMINALS, AN IMAGE FORMING APPARATUS FOR PERFORMING PRINT PROCESSING ON THE PLURALITY OF PRINT JOBS, AND A TERMINAL THAT TRANSMITS PRINT JOBS TO THE PRINTER CONTROLLER

This application is based on an application Nos. 2000-8807, 2000-8808, and 2000-10832 filed in Japan, the content of which is hereby incorporated by reference.

BACKGROUND OF THE INVENTION

1. Field of the Invention

This invention relates to a printer controller that receives print jobs transmitted from a plurality of terminals, and has a printer perform print processing, an image forming apparatus that receives print jobs transmitted from a plurality of terminals and performs print processing, and a terminal that transmits print jobs to the print controller.

2. Related Art

Recently, the advance of office automation (OA) has led to a situation in many companies where each employee is allocated a terminal such as a personal computer in which word processing or document/image processing software is installed, and documents and illustrations are created. These terminals are connected to a printer server via LAN (local area network), the printer server being a printer controller that instructs a printer to perform print processing. The printer is shared by all terminals, and prints out the printed sheets for created documents and the like. Here, information required for print processing is referred to as a 'print job', and one or more printed sheets that have been printed and emitted by the printer as a 'printed document'.

The printer server temporarily stores a print job transmitted via the LAN from the terminals, reads the print job from the memory and has print processing performed. However, while the print job is still being processed, other print jobs may be transmitted one after the other from a plurality of other terminals, and so a plurality of print jobs may be stored in the memory. In other words, a plurality of print jobs may be waiting to be printed. In this case, once printing of the print job in progress is completed, a conventional printer system would print the print jobs stored in the memory in order from the print job that was the first to be received.

However, depending on how a terminal is currently being operated, print jobs which are not particularly urgent may be mixed in among the print jobs stored in the memory. Take one example. An operator A issues instructions to print a number of print jobs via a terminal A, and then continue to operate the terminal A in order, for example, to produce another print job. Since the operator A does not soon go to collect the printed document, it is likely that print processing for these print jobs is not very urgent. At the same time, an operator B issues an instruction to print a print job via a terminal B, and then soon goes to collect the printed document, suggesting that print processing for this print job is urgent. However, when a conventional technique in which print processing is performed on print jobs in the order in which they arrive at the printer server is used, the print job from the terminal B may arrive at the printer server when the number of print jobs with little urgency from the terminal A are being printed. In other words, even if the operator B hurries to the printer to go and collect the printed document, they may have to wait for the printed documents for the operator A, who is not in much of a hurry, to be output.

Furthermore, the content and progress of the document creation operations for each terminal varies according to the operator involved, and consequently a variety of print waiting conditions are generated. Take a situation in which operator A makes a print instruction for a print job once it has been completed, and once a plurality of print jobs have been completed, goes to collect the corresponding printed documents from the printer at the same time, while operator B makes a print operation for an urgent print job while the print instructions made by operator A are being performed. In this case, the print job for operator B is stored in the printer server memory after the first half of the print jobs for operator A have been stored, and then the second half of the print jobs for operator A are stored.

In such a case, even if the operator B hurries to the printer to collect the printed document, a conventional printer server like the one described above forces the operator B to wait for the first half of the print jobs for operator A, who is still creating the remaining half of their print jobs (in other words operator A is not in such a hurry to get the printed documents), to be printed.

SUMMARY OF THE INVENTION

A first object of the invention is to provide a printer controller that is capable, when a plurality of print jobs are waiting to be printed, of performing print processing in which preference is given to urgent print jobs over non-urgent print jobs.

A second object of the invention is to provide an image forming apparatus having the same function as the printer controller fulfilling the first object.

A third object of the invention is to provide a terminal that transmits print jobs to the printer controller so that print processing can be performed giving preference to print jobs that are thought to be urgent.

A fourth object of the invention is to provide a printer controller that has print jobs performed giving preference to print jobs transmitted from a terminal whose operator is in a hurry.

A fifth object of the invention is to provide an image forming apparatus that has the same function as the printer controller fulfilling the fourth object.

The first object is achieved by a printer controller that receives print jobs transmitted from a plurality of terminals, and instructs a printer to perform print processing. The printer controller includes a detector, a priority determining unit, and a controller. The detector detects pieces of operation information, each relating to a current operation state of one of the plurality of terminals. The priority determining unit determines priority levels for a plurality of print jobs waiting to be printed, a priority level of a print job determined based on a piece of operation information detected by the detector from a terminal that transmitted the print job. The controller instructs the printer to process the plurality of print jobs in an order based on the determined priority levels.

The first object may also be realized by a printer controller that receives print jobs transmitted from a plurality of terminals, and controls a printer to perform print processing. The printer controller includes a detector, a priority determining unit and a controller. The detector detects whether an operator is in a vicinity of each terminal. The priority determining unit determines priority levels for a plurality of print jobs waiting to be printed, a priority level of a print job determined based on a detection result produced by the detector for a terminal that transmitted the print job. The controller controls the printer so that the plurality of print jobs are processed in an order based on the determined priority levels.

The first object may also be realized by a printer controller that receives print jobs transmitted from a plurality of terminals, and instructs a printer to perform print processing. The printer controller includes memory, a transmission control unit and a controller. The memory stores each of the received print jobs in correspondence with information indicating a transmission origin terminal. The transmission control unit transmits a request signal requesting transmission of a piece of print processing information for a print job to the transmission origin terminal. The controller receives the piece of print processing information transmitted from the terminal that received the request signal, and controls the printer so as to perform print processing of the print job based on the received piece of print processing information.

The second object is achieved by an image forming apparatus that receives print jobs transmitted from a plurality of terminals, and performs print processing. The image forming apparatus includes an image forming unit, a detector, a priority determining unit and a controller. The image forming unit performs print processing corresponding to the received print jobs. The detector detects pieces of operation information, each relating to a current operation state of one of the plurality of terminals. The priority determining unit determines priority levels for a plurality of print jobs waiting to be printed, a priority level of a print job determined based on a piece of operation information detected by the detector from a terminal that transmitted the print job. The controller instructs the image forming unit to process the plurality of print jobs in an order based on the determined priority levels.

The second object may also be achieved by an image forming apparatus that receives print jobs transmitted from a plurality of terminals, and performs print processing. The image forming apparatus includes an image forming unit, memory, a transmission control unit, and a controller. The image forming unit performs print processing corresponding to the print jobs. The memory stores each of the received print jobs in correspondence with information indicating a transmission origin terminal. The transmission control unit transmits a request signal requesting transmission of a piece of print processing information to a transmission origin terminal of a print job stored in the memory. The controller receives the piece of print processing information transmitted from each terminal that received the request signal, and controls the image forming unit so as to perform print processing of the print job based on the received piece of print processing information.

The third object is achieved by a terminal that transmits print jobs to a printer controller controlling a printer shared with a plurality of other terminals. The terminal includes a receiving unit, a timer and a transmission controller. The receiving unit receives a print job input by an operator. The timer measures an elapsed time since an input device that includes the receiving unit was last operated. The transmission controller transmits the input print job after waiting for the timer to measure a specified time.

The third object may also be achieved by a terminal that transmits print jobs to a printer controller. The terminal includes an information generating unit, a reception control unit and a transmission control unit. The information generating unit generates a piece of print processing information indicating processing of a print job that has already been transmitted to the printer controller. The reception control unit receives a request signal requesting the transmission of the piece of print processing information from the printer controller. The transmission control unit transmits the piece of print processing information generated when the request signal is received, in response to the request signal.

The fourth object is achieved by a printer controller that receives print jobs transmitted from a plurality of terminals, and instructs a printer to perform print processing. The printer controller includes memory, a first timer, a priority determining unit, and a controller. The memory stores each of the received print jobs in correspondence with information indicating a transmission origin terminal. The first timer measures, for each terminal, an elapsed time since reception of a most recent print job. The priority determining unit determines a priority level for each terminal according to the measured elapsed times. The controller instructs the printer to process the plurality of print jobs stored in the memory in an order based on the determined priority levels.

The fifth object is achieved by an image forming apparatus for receiving print jobs from a plurality of terminals. The image forming apparatus includes an image forming unit, memory, a first timer, a priority determining unit and a controller. The image forming unit performs print processing corresponding to the received print jobs. The memory stores each received print job in correspondence with information indicating a transmission origin terminal. The first timer measures, for each terminal, an elapsed time since a print job was last received. The priority determining unit determines a priority level for each terminal according to the measured elapsed times. The controller instructs the image forming unit to print the plurality of print jobs stored in the memory in an order based on the determined priority levels.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 4 shows a print job buffer in the first embodiment;

FIG. 5 shows a status storage table;

FIG. 10 shows a status storage table in the second embodiment;

FIG. 11 shows a print job buffer in the second embodiment;

FIG. 16 shows a priority storage table in the third embodiment;

FIG. 25 shows an example structure for a buffer 421B included in the print server S in the fourth embodiment;

DESCRIPTION OF THE PREFERRED EMBODIMENTS

The following is a description of the embodiments of the invention with reference to the drawings.

First Embodiment

Figure 1:
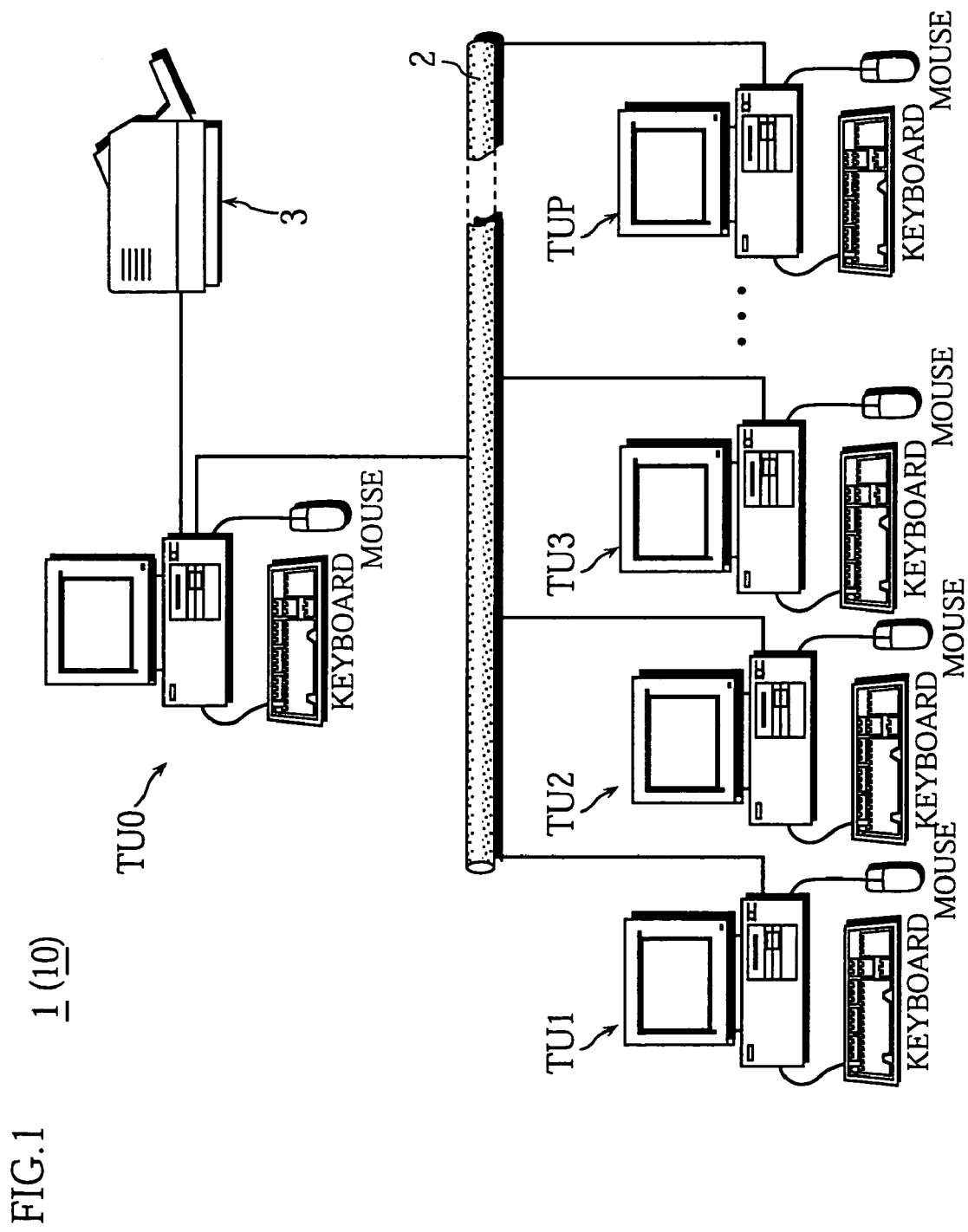
FIG. 1 shows an overall structure of a printer system of a first embodiment.

FIG. 1 shows a structure of a printer system 1 in a first embodiment.

The printer system 1 includes a plurality of personal computers (TU0 to TUP), having a mouse and keyboard for input of data, that are connected to via a LAN (local area network) 2 compliant with the Ethernet standard. One of the plurality of personal computers is connected to a printer 3, and used as a specialized print server TU0 (printer controller). The other personal computers TU1 to TUP are used as terminals for creating documents and the like.

A number of terminals P having a same structure is installed (P being an integer of 2 or more). Each terminal (TU1 to TUP) is identified by a terminal number 1, 2, 3, ..., p, P. Furthermore, the printer server TU0 is assigned an identification number (hereafter ID number) '0'.

Figure 2:
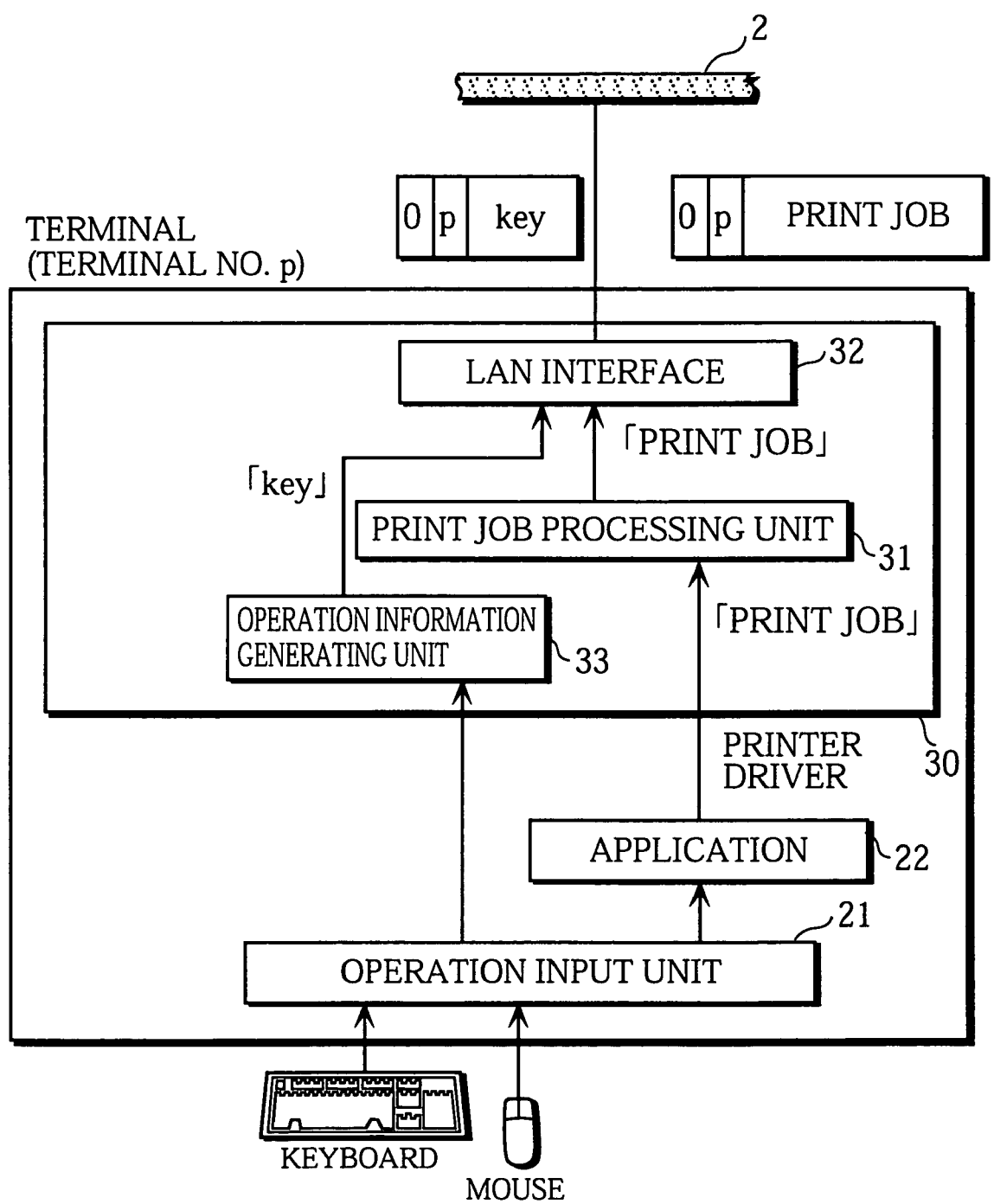
FIG. 2 is a block diagram showing a terminal in the first embodiment.

FIG. 2 is a block diagram showing a terminal. In the drawing, the terminal includes a operation input unit 21, an application 22, and a printer driver 30. The printer driver 30 includes a print job processing unit 31, a LAN interface 32, and a operation information generating unit 33.

The operation input unit 21 outputs input information received via an input means such as a mouse or a keyboard to the application 22.

The application 22 generates a print job, including print data such as documents and illustrations, based on input information received from the operation input unit 21. Furthermore, when an operator (user) makes a print indication via the input means, the application 22 outputs the generated print job to the print job processing unit 31.

The print job processing unit 31 temporarily stores the print job received from the application 22 in a buffer (not shown), and outputs the received print job to the LAN interface 32.

The LAN interface 32 attaches a destination ID number (in this case, the ID number '0' of the printer server TU0) and a sender ID indicating the terminal number 'p' to the print job input from the printer processing unit 31, and transmits the print job to the LAN 2.

Furthermore, the operation input unit 21, when an input is received from the input means, in other words when a user performs an operation such as pressing a key on the keyboard or moving the mouse, notifies the operation information generating unit 33 that an operation has been received.

Upon receiving such a notification, the operation information generating unit 33 generates a code 'key' as operation information indicating that an operation has been performed on the input means, and outputs the generated code to the LAN interface 32.

Once the operation information 'key' has been input, the LAN interface 32 attaches the destination ID number '0' and the sender ID 'p' to the operation information 'key' in the same way as for the print job, and transmits it to the LAN 2.

Figure 3:
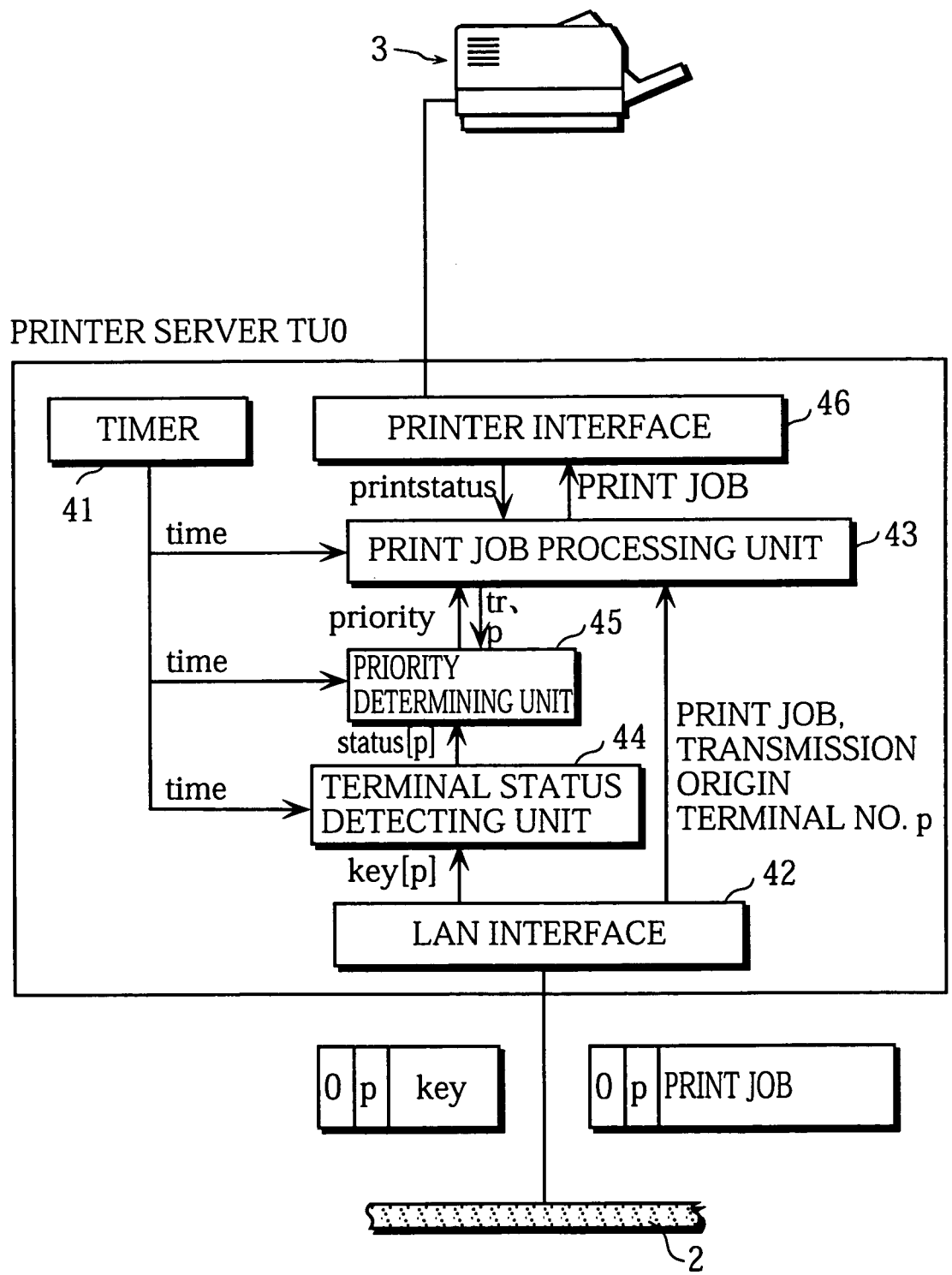
FIG. 3 is a block diagram showing a printer server in the first embodiment.

FIG. 3 is a block diagram showing a printer server TU0. As shown in the drawing, the printer server TU0 includes a timer 41, a LAN interface 42, a print job processing unit 43, a terminal detecting unit 44, a priority determining unit 45, and a printer interface 46.

The timer 41 shows a current time, and is referred to by the print job processing unit 43, the terminal status detecting unit 44, and the priority determining unit 45 as necessary.

The LAN interface 42 selects and receives data addressed to itself, in other words data destined for the printer server TU0, from data transmitted from the terminals TU1 to TUP to the LAN 2. When the transmitted data is a print job, the LAN interface 42 outputs the print job to the print job processing unit 43, and when it is piece of operation information 'key', outputs the piece of operation information 'key' to the terminal status detecting unit 44.

The print job processing unit 43 includes a print job buffer such as the one shown in FIG. 4, and temporarily stores the print job input from the LAN interface 42 into the print job buffer 431. The print job is stored in a vacant buffer area (a buffer area whose flag is set as OFF) having a lowest buffer number out of storage areas identified by buffer numbers 1 to N (N being a positive integer). Here, the print job processing unit 43 stores a terminal number transmitted together with the print job, and a time (tr) at which the print job was received in a storage area corresponding to the buffer number, and sets a flag corresponding to the buffer number at ON. The time (tr) is obtained by referring to a time output from the timer 41 when the print job is received by the print job processing unit 43.

When the printer 3 is available to perform print processing, the print job processing unit 43 outputs pairs of terminal numbers p and times tr stored in the print job buffer 431 in order from the lowest buffer number, to the priority determining unit 45, and instructs the priority determining unit 45 to determine the priority levels of the output terminal numbers p. Then, the print job processing unit 43 stores priority levels determined by the priority determining unit 45 in corresponding priority storage areas. The priority determining processing performed by the priority determining unit 45 and the definition of 'priority level' are dealt with later in this specification.

Furthermore, the print job processing unit 43 refers to priority levels stored in the print job buffer 431, and determines the next print job for which print processing is to be performed. This is also explained in more detail later in this specification.

To return to FIG. 3, the terminal status detecting unit 44, detects how long a non-operational status has been continuing for each of the terminals TU1 to TUP. The terminal status detecting unit 44 has a status storage table 441, as shown in FIG. 5. The status storage table 441 stores times 't1' at which a piece of operation information 'key' was last received from each terminal TU1 to TUP, periods 'tk' that has expired since each time t1, and non-operational statuses 'status' determined by the length of the period tk, in correspondence with terminal numbers 1 to P.

The terminal status detecting unit 44 has a buffer memory (not shown) for temporarily storing pieces of operation information 'key' input from the LAN interface 42. The terminal status detecting unit 44 searches the buffer memory in a specified extremely short period, and detects whether a piece of operation information 'key' is stored in the buffer for each of the terminal numbers 1 to P in turn.

If a piece of operation information 'key' is detected, the terminal status detecting unit 44 refers to the timer 41, and stores the reception time of the detected piece of operation information 'key' in a storage area of a corresponding terminal number in the status storage table 441 (updates the reception time t1), while deleting the operation information 'key' from the buffer memory.

If a piece of operation information 'key' is not stored for a particular terminal, the terminal status detecting unit 44 refers to the timer 41, and calculates an elapsed time tk by subtracting the current time from the reception time t1 stored in correspondence with the terminal number for the terminal. The calculated elapsed time tk is then stored in the corresponding storage area (the elapsed time tk is updated). Therefore, the elapsed time tk indicates the time that has passed since a piece of operation information 'key' was last received, in other words the duration of the non-operational status for the corresponding terminal.

Furthermore, the terminal status detecting unit 44 updates the reception time t1 and the elapsed time tk, as well as updating the non-operational status 'status' indicated by one of the numerical values '0', '1', and '2'. The non-operational status 'status' indicates the length of time for which a non-operational status has been continuing in each of terminals TU1 to TUP. Larger numerical values for the status indicate that the non-operational status has been continuing for a longer period of time. When the duration of the non-operational status is short, in other words when the elapsed time tk is shorter than a first reference time TK1, the terminal status detecting unit 44 sets the status at '0'. When the elapsed time t1 is no less than the first reference time TK1 and less than a second reference time TK2, the terminal status detecting unit 44 sets the status at '1', and when the elapsed time t1 is no less than the second reference time TK2, at '2'. Here, TK1<TK2, and TK1 and TK2 are set at, for example, 1 minute and 5 minutes respectively, while statuses represented by a larger numerical values are said to be higher, and those represented by smaller numerical values to be lower.

A terminal with the status '0' is judged to be performing continuous operations (inputs made via the input means). Therefore, even if print processing of a print job from the terminal is performed, and printed document produced by the printer 3, it is considered likely that the sheets will be not be collected by the operator of the terminal. On the other hand, in a terminal with the status '2', the non-operational status has been continuing for some time (at least 5 minutes), so the operator of this terminal has probably left their seat to go and collect the printed document from the printer 3. Moreover, a terminal with the status '1' is in an intermediate state, and so the possibility that the operator of this terminal will go to fetch the printed document is judged to be fairly high.

This embodiment assumes that the operators of terminals with higher statuses are in more of a hurry to collect the printed document, and has print processing performed so as to give priority to print jobs from terminals with higher statuses. This processing is performed by the print job processing unit 43, and is described later in this specification.

Upon receiving a priority determining instruction from the print job processing unit 43 in accordance with a paired terminal number p and reception time tr, the priority determining unit 45 determines the priority level of the terminal with the terminal number p by referring to the reception time tr and a corresponding status stored in the status storage table 441 in the terminal status detecting unit 44. The priority determining unit 45 subtracts the reception time tr from a current time obtained from the timer 41 to calculate a time that has expired from the reception time until the present. If the elapsed time is shorter than a specified time TRS, the priority determining unit 45 outputs the status of the terminal number p stored in the status storage table 441 to the print processing unit 43 as the priority level. On the other hand, if the elapsed time is no less than the specified time TRS, the priority determining unit 45 adds 1 to the status of the terminal number p and outputs the resulting value to the print job processing unit 43 as the priority level.

If the basic principle of this embodiment that print jobs from terminals with higher statuses should be given priority when printing is followed, the status may be used as the priority level without any alteration. However, it is not desirable for too long a period to pass between the time TRS that a print job is received by the printer server TU0, and printing, so the priority level is determined by adding 1 to the status rather than using it without alteration. Unaltered status values 0 to 2, or a status to which 1 has been added are used as priority levels, so a priority level can have the values 0, 1, 2, or 3. Note that the specified time TRS can be set at, for example, 10 minutes.

Once the printer 3 is available for printing, the priority level of each print job stored in the print job buffer 431 has been determined by the priority determining unit 45, and the priority levels in the print job buffer updated, the print job processing unit 43 determines the next print job on which print processing is to be performed.

The print job processing unit 43 first searches for a print job with the highest priority level '3'. This search is performed on buffer numbers whose flags are set at ON in the print job buffer 431, in order from a lowest buffer number. Once a print job with a priority level '3' has been found, the print job is output to the printer interface 46, and the corresponding flag set at OFF.

If a search is made as far as a last buffer number N without finding a print job with the priority level '3', the target priority level is lowered to '2', and an identical kind of search performed. Following this, the priority level is lowered one level at a time, and the search performed. When a relevant print job is found, it is output to the printer interface 46 and a corresponding flag set to OFF.

The printer interface unit 46 outputs a print job input by the print job processing unit 43 to the printer 3. The printer interface 46 monitors the processing state of the printer 3, and outputs a print status signal to the print job processing unit 43. If the printer 3 is currently printing a document, the print status signal is a BUSY signal, and once printing has been completed and the printer 3 is available for printing, the BUSY signal is switched to a READY signal.

Figure 6:
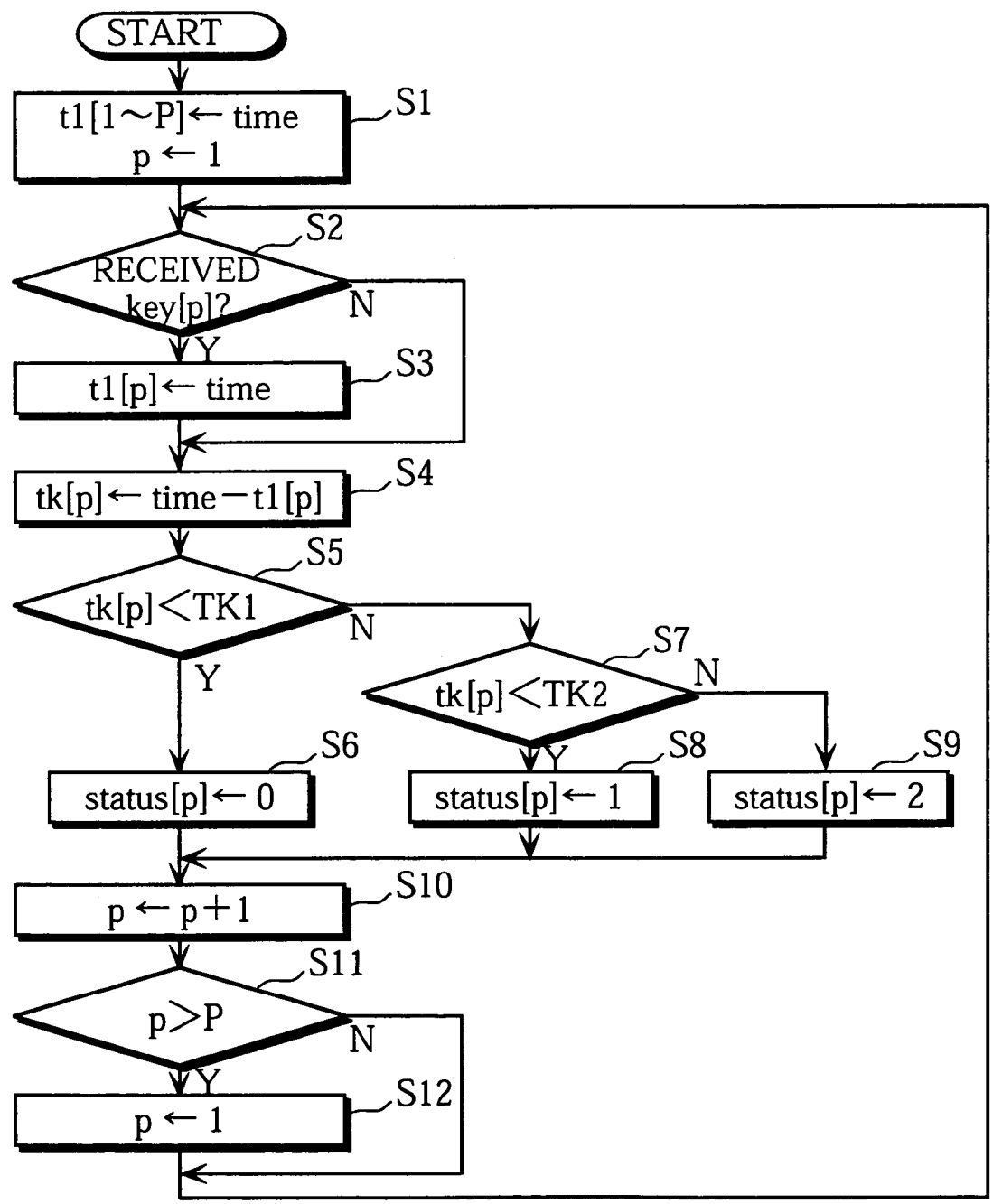
FIG. 6 is a flowchart showing processing performed in the first embodiment by a terminal status detecting unit to set a non-operational status.

FIG. 6 is a flowchart showing status setting processing performed by the terminal status detecting unit 44. A program whose content corresponds to the processing shown in the flowchart is activated when the printer server TU0 is switched on. Firstly, the terminal status detecting unit 44 performs initialization by storing the time that the program was activated in storage areas (FIG. 5) corresponding to reception times tl for all terminal numbers in the status storage table 441, and storing a value '1' as a variable 'p' specifying a search target in the buffer memory (i.e. a terminal number) (step S1).

Next, the terminal status detecting unit 44 searches the buffer memory, and checks whether a piece of operation information 'key' for the terminal number 1 (p=1) exists (step S2). If such a piece of operation information exists, the terminal status detecting unit 44 updates the reception time t1 for the terminal number 1 in the status storage table 441 to the current time (step S3). If not, step S3 is skipped, and the terminal status detecting unit 44 finds an elapsed time tk by subtracting the reception time t1 from the current time, and updates the elapsed time for the terminal number 1 in the status storage table 441 (step S4).

Following this, the terminal status detecting unit 44 updates the status of the terminal number 1 in the status storage table 441, according to the duration of the elapsed time tk for the terminal number 1. If the elapsed time tk is less that the first reference time TK1 (step S5, Yes), the status is set at '0' (step S6), if the elapsed time tk is no less than the first reference time TK1, and less than the second reference time TK2 (step S7, Yes), the status is set at '1' (step S8), and if the elapsed time is no less than the second reference time TK2 (step S7, No), the status is set at 2 (step S9).

The above processing (steps S2 to S9) is repeated for terminal numbers as far as a terminal number P (step S10). Once processing for the terminal number P has been completed (step S11, Yes), the terminal status detecting unit 44 sets the variable 'p' at '1' (step S12). In this way, updating of status can be achieved for terminal numbers 1 to P. The repetition of the processing for each terminal number is set so as to be performed in an extremely short period.

Figure 7:
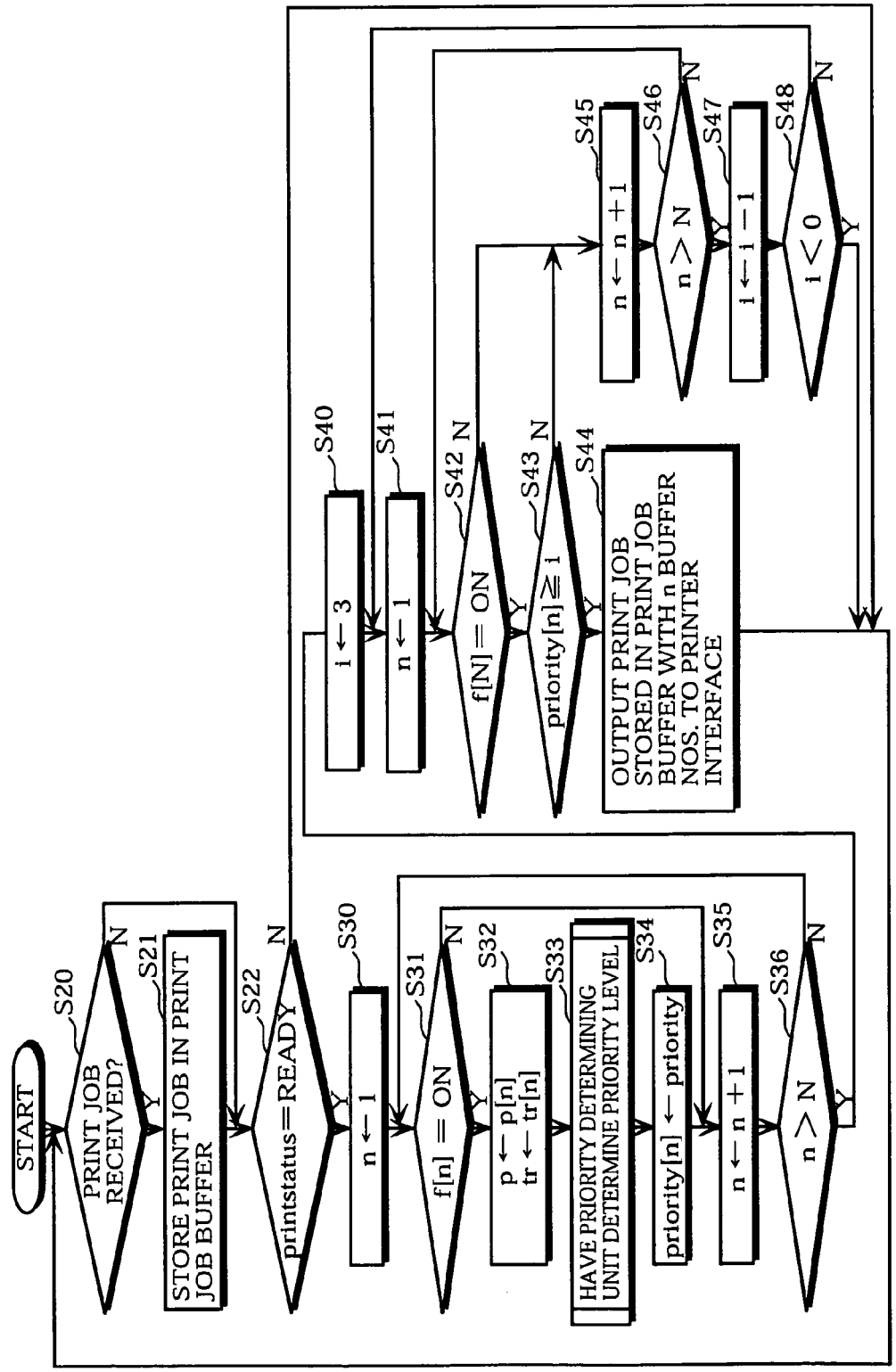
FIG. 7 is a flowchart showing priority determining processing performed in the first embodiment by a print job processing unit to store print jobs in a print job buffer, and determine a next print job to be performed from among the stored print jobs.

FIG. 7 is a flowchart showing processing performed by the print job processing unit 43 to store print jobs in the print job buffer 431, and to determine the next print job to be processed from among the stored print jobs.

The processing shown in the flowchart of FIG. 7 can be broadly divided into print job storing processing (step S20 to S21), priority updating processing of terminal priority levels stored in the print job buffer 431 (steps S30 to S36), and processing for determining the next print job to be performed (steps S40 to S48).

First, upon receiving a print job input from the LAN interface 42 (step S20, Yes), the print job processing unit 43 stores the print job and the other necessary items referred to above in the print job buffer 431 (step S21).

Then, the print job processing unit 43 checks whether the print status signal from the printer interface 46 is a BUSY signal or a READY signal (step S22). If the print status signal is a BUSY signal (step S22, No), control returns to step S20, and if it is a READY signal (step S22, Yes), control moves to the priority updating processing (steps S30 to S36).

In the priority updating processing, the print job processing unit 43 first stores a value '1' as a variable 'n' that specifies a terminal number in the print job buffer 431 that is to be updated (step S30). Then, the print job processing unit 43 determines whether a flag for the buffer number 1 (n=1) is set at ON (step S31).

If the flag is not ON (step S31, No), the print job processing unit 43 increments the variable 'n' by 1, thereby specifying a different terminal number for updating. If the flag corresponding to this number is ON (step S31, Yes), processing continues onto step S32.

At step S32, the print job processing unit 43 outputs a terminal number p and a reception time tr stored in the storage area with the buffer number n to the priority determining unit 45, and has the priority determining unit 45 determine a priority level (step S33).

Figure 8:
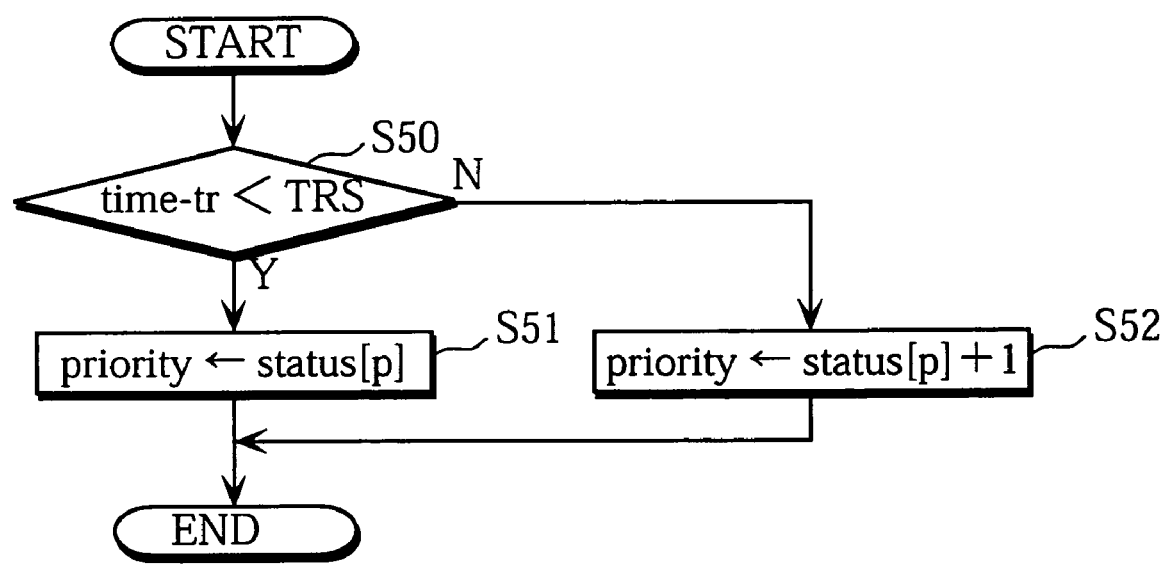
FIG. 8 is a flowchart showing processing performed in the first embodiment by a priority determining unit.

FIG. 8 is a flowchart showing priority determining processing performed by the priority determining unit 45. The priority determining unit 45 first determines whether an elapsed time between a reception time tr input from the print job processing unit 43 and a current time is shorter than a specified period TRS (step S50).

If the elapsed time is shorter (step S50, Yes), the priority determining unit 45 outputs a status corresponding to a terminal number p input from the print job processing unit 43 without alteration to the print job processing unit 43 as a priority level (step S51). If the elapsed time is not shorter (step S50, No), the priority determining unit 45 outputs a value obtained by adding 1 to the status corresponding to the terminal number p input from the print job processing unit 43 as a priority level (step S52).

To return to FIG. 7, the print job processing unit 43 stores the priority level input from the priority determining unit 45 in a storage area in the print job buffer 431 that corresponds to the terminal number p (step S34).

Following this, the processing of steps S31 to S35 is repeated for each buffer number in turn, thereby enabling the priority levels of buffer numbers storing print jobs to be updated. Once processing has been completed as far as buffer number N (step S36, Yes), control moves to print job determining processing (steps S40 to S48).

First, the print job processing unit 43 stores a value 3 in a variable 'i' specifying a priority level (step S40), and in order starting from buffer number 1 (step S41, S45), determines whether buffer numbers with flags set at ON (step S42, Yes), have a priority level of '3' or more (i=3) (step S43).

Then, the print job processing unit 43 outputs a print job having a buffer number that was first determined to have a priority level of at least '3' to the printer interface 46 (step S44). Note that the print status signal is a BUSY signal between the start of the print processing performed once the print job is output via the printer interface 46 to the printer 3, and the end of the print processing. Consequently, during this period the print job processing unit 43 can only execute processing for storing print jobs.

If the print job processing unit 43 searches as far as the buffer number N (step S46, Yes), but there is no buffer number with a priority level of 3 or more, the priority level 'i' is lowered one level at a time (step S47), and the same processing as above performed for each priority level (step S41 to S46).

If a corresponding print job cannot be found even by lowering the priority level to the lowest level of 1 (step S48, Yes), in other words, if no print jobs are stored in the print job buffer 431, control returns to step S20, and the print job processing unit waits for a print job to be input. As explained above, the print system 1 of the first embodiment enables the next print job to be determined, in a case when a plurality of print jobs are waiting to be processed, and the printer 3 is available to perform print processing, by checking the duration of a continuous period of non-operation for each of the terminals that have transmitted the print jobs. In other words, status is set according to the length of a continuous period of non-operation, and preference is given to print jobs from terminals with a higher status, when determining the next print job to be processed.

As a result, print processing is performed irrespective of the order in which print jobs are received by the printer server TU0. Here, print jobs for an operator of a terminal with a high status, in other words an operator who is considered likely to have left their seat to collect the printed document from the printer 3 are given priority over print jobs for an operator of a terminal with a low status, that is an operator who is considered (from input being made to the input means) to still be working at their terminal. In this embodiment, the former is considered to be in more of a hurry to perform print processing than the latter.

Second Embodiment

In the first embodiment, the printer server TU0 monitors the status of each terminal, and when competing print jobs exist, determines the priority levels of print jobs in response to the status of a transmitting terminal, determining the next print job to be processed based on the determined priority levels.

Monitoring of status is performed by referring to a time that has expired since a piece of operation information 'key' was last transmitted from each terminal via the LAN 2.

A piece of operation information 'key' is generated and transmitted to the printer server TU0 via the LAN 2 each time an operation of a terminal, such as one press of a key on the keyboard, is performed. Therefore, a considerable number of pieces of operation information 'key' are transmitted from each terminal per unit time, and when the entire system is considered, it is clear than an extremely large number of pieces of operation information will occupy the LAN 2 at any one point in time. In other words, the communication load placed on the LAN 2 will be considerably increased.

Here, the second embodiment proposes a way of achieving virtually the same effect as in the first embodiment, without increasing the communication load placed on the LAN.

A printer system 10 of the second embodiment has the same form as the printer system 1 shown in the first embodiment, but the structure of the printer server and each terminal differ.

In the second embodiment, a conventional printer server, that is one that temporarily stores print jobs transmitted from the terminals via the LAN 2 in memory, reads print jobs from the memory in the order that they were received, and has the printer process the jobs in that order, is used as the printer server.

Figure 9:
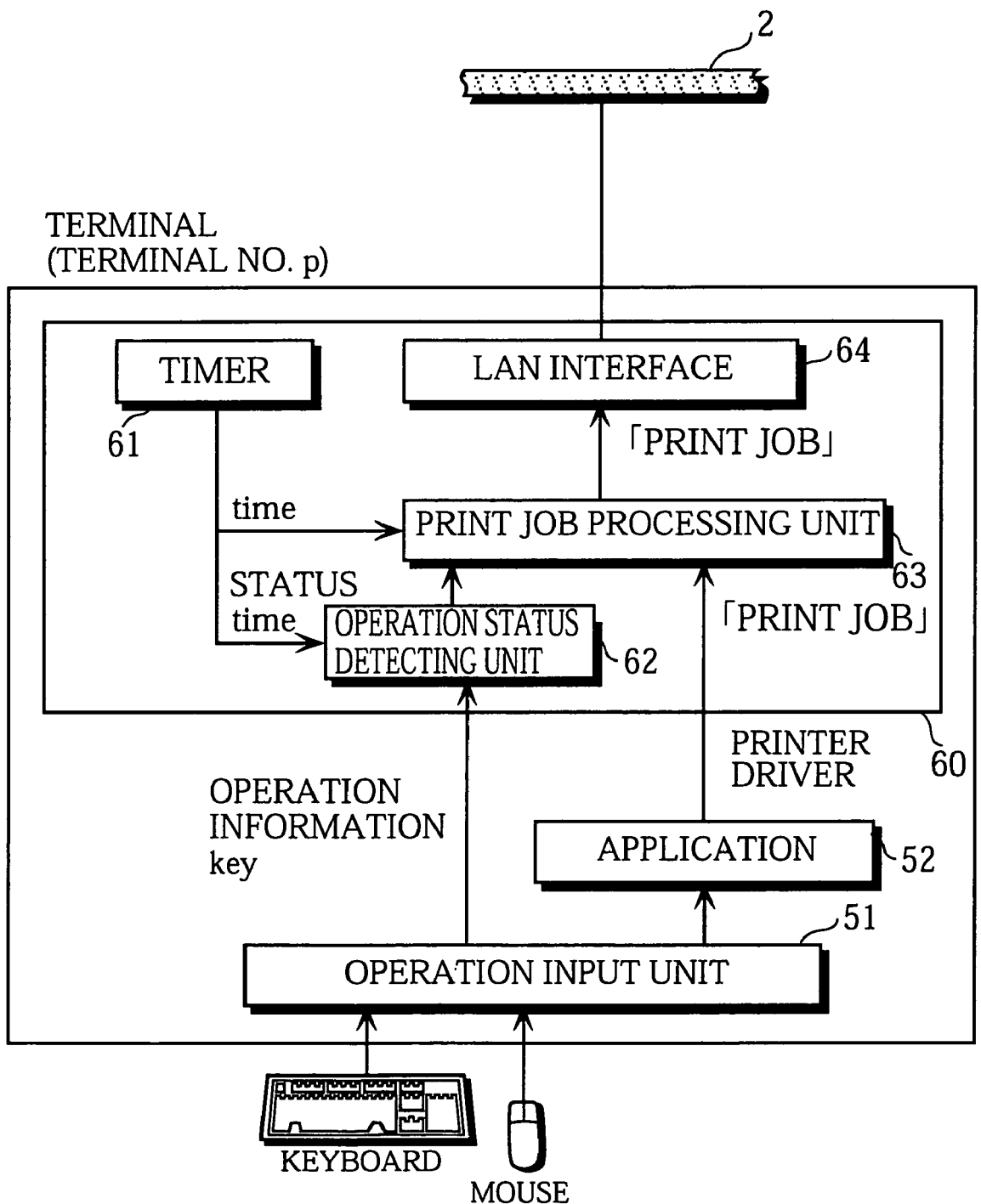
FIG. 9 is a block diagram of a terminal in a second embodiment.

FIG. 9 is a block diagram showing a terminal in the second embodiment. In the drawing, the terminal includes an operation input unit 51, an application 52, and a printer driver 60. The printer driver 60 includes a timer 61, an operation status detecting unit 62, a print job processing unit 63, and a LAN interface 64.

The timer 61 shows the current time. The timer 61 is referred to by the print job processing unit 63, and the operation status detecting unit 62 when necessary.

The operation input unit 51 outputs input information received via an input means such as a mouse or a keyboard to the application 52. Also, when an input is received from the input means, in other words when an operator presses one of the keys on the keyboard, or moves the mouse, the operation input unit 51 generates a code 'key', as a piece of operation information indicating the operation, and outputs the generated piece of operation information to the operation status detecting unit 62.

The operation status detecting unit 62 has a buffer memory (not shown) that temporarily stores pieces of operation information 'key' input from the operation input unit 51. The operation status detecting unit 62 searches the buffer memory during a specified extremely short period to detect whether a piece of operation information 'key' is stored.

If a piece of operation information 'key' is detected, the operation status detecting unit 62 refers to the timer 61, and stores the time as a reception time for the piece of operation information 'key' in a storage area for a reception time t1 in the status storage table shown in FIG. 10 (updates the reception time), and deletes the piece of operation information 'key' from the buffer memory.

If a piece of operation information 'key' is not stored, the operation status detecting unit 62 refers to the timer 61, finds an elapsed time by subtracting the reception time t1 stored in the status storage table 621 from the current time, and stores the resulting value in a storage area corresponding to the elapsed time tk (updates the elapsed time). Therefore, the elapsed time tk shows the time that has expired since an input was last made into the input means, in other words the length of time that the terminal has been in a non-operation state.

In addition to updating the reception time and the elapsed time, the operation status detecting unit 62 updates the status that is shown by one of the numerical values '0', '1', and '2'. The definition of the word 'status' and the updating processing are the same as in the first embodiment. In other words the non-operational status 'status' indicates a duration of a period during which a terminal has not been operated, and a higher status value indicates that the non-operational status has been continuing for a longer period of time. If the duration of a non-operation state, in other words, the elapsed time tk, is shorter than a first reference time TK10, the status is set at '0', if the elapsed time tk is no less than the first reference time TK10, and less than a second reference time TK20, the status is set at '1', and if the elapsed time tk is no less than the second reference time TK20, the status is set at '2'. Here, TK10<TK20, and as in the first embodiment, TK10 and TK20 are set, for example, at 1 minute and 5 minutes respectively.

Note that the reference values TK10 and TK20 may be set at different values for each terminal. This may be, for example, due to differences in the work content carried out by the operator of each terminal. In other words, when an operator is carrying out work such as making a typewritten copy of a handwritten original using word processing software, it is natural that input operations should be performed without a break, and so the reference values TK10 and TK20 are set fairly low. On the other hand, when an operator is composing a document as they are typing, it is natural that input operations should be interrupted, and the reference values TK10 and TK20 are set fairly high. By setting the reference values in accordance with the operator's purpose, the process of determining whether the operator has left their seat in order to collect printed document from the printer can be performed more accurately.

The application 52 generates print jobs, including print data such as documents and illustrations, based on input information received from the operation input unit 51. Furthermore, when an operator makes a print instruction via the input means, the application 52 outputs the generated print job to the print job processing unit 63.

The print job processing unit 63 has a print job buffer 631 like the one shown in FIG. 11, in which it temporarily stores a print job input from the application 52. The print job is stored in a vacant buffer (a buffer whose flag is set as OFF) having a lowest buffer number out of storage areas identified by buffer numbers 1 to N (N being a positive integer). Here, the print job processing unit 63 stores a time (tr) at which the print job was received in a storage area corresponding to the buffer number, and sets a flag corresponding to the buffer number at ON once storage has been completed. The time (tr) is obtained by referring to a time output from the timer 61 when the print job is received.

The print job processing unit 63 refers to a status stored in the status storage table 621 in the operation status detecting unit 62, and postpones transmission of the print job to the printer server while the status is '0'. A status of '0' indicates that operations are continuing to be made on the terminal. This is because there is a high possibility that, even if a print job from this terminal is printed, the printed document will be left uncollected on the printer tray for some time.

Therefore, a situation in which a plurality of print jobs are accumulated in the print job buffer 63 waiting for transmission may occur while transmission is being postponed. In this case, the print job processing unit 63 transmits the print jobs stored in the print job buffer 631 in order to the printer server, starting from the print job with the earliest reception time tr (in other words the print job that was received the longest time before).

If the terminal status is '1', a print job is output to the LAN interface 64 for transmission to the printer server only once a specified time TRT has passed since the reception time tr of the print job. When the terminal status is '1', it is not certain that the operator has gone to collect the printed document from the printer. Therefore, the transmission of print jobs from the terminal is generally postponed, but since it is not desirable that print jobs which have been held for more than a time TRT after they were received remain permanently untransmitted, so such print jobs can be transmitted. The time TRT is set at, for example, 10 minutes.

If the terminal status is '2', the operator is considered to have gone to collect printed document from the printer, so print jobs from such a terminal are output to the LAN interface 64 for transmission to the printer server, without any preconditions.

Once a print job has been output to the LAN interface 64, the print job processing unit 63 sets a corresponding flag in the status storage table 621 at OFF.

The LAN interface 64 attaches a destination ID number (in this case an ID number '0' for the printer server), and a terminal number 'p' to the print job input from the print job processing unit 63, and outputs the print job to the LAN.

The printer server receives print jobs transmitted from each terminal via the LAN 2, and performs print processing on print jobs in the order of reception.

As explained above, the terminal of the second embodiment does not transmit a print job to the printer server, even if a print instruction has been issued by an operator, unless the non-operational status has continued for a certain period. As a result, the printer system in this embodiment performs print processing so that print jobs for those people in a hurry are given priority over those for people who are not, regardless of the order in which print instructions were received.

The following is an explanation of a concrete example of such a method. An operator A of a terminal TU1 makes a print instruction for a print job a, and soon after this (no more than 1 minute later), an operator B of a terminal TU2 makes a print instruction for a print job b. In other words, the situation is that the printer system 10 has two print jobs waiting to be printed for which print instructions have been issued. Suppose that the operator A continues to operate the terminal TU1, but the operator B leaves their seat to collect the printed document from the printer soon after making the print instruction.

Conventionally, the print job a requested by the operator A will arrive at the printer server ahead of the print job b, and so this print job a will be printed first. As a result, operator B, who has hurried off to collect the printed document, will have to wait until the document for operator A, who is in no particular hurry, has been printed.

In contrast, in the second embodiment, even if the print instruction for print job b was issued after that for print job a, the print job b will arrive at the printer server first and the printed document for the operator B will be output ahead of that for the operator A. Therefore, the operator B who has hurried to the printer will be able to obtain their printed document without waiting very long.

Figure 12:
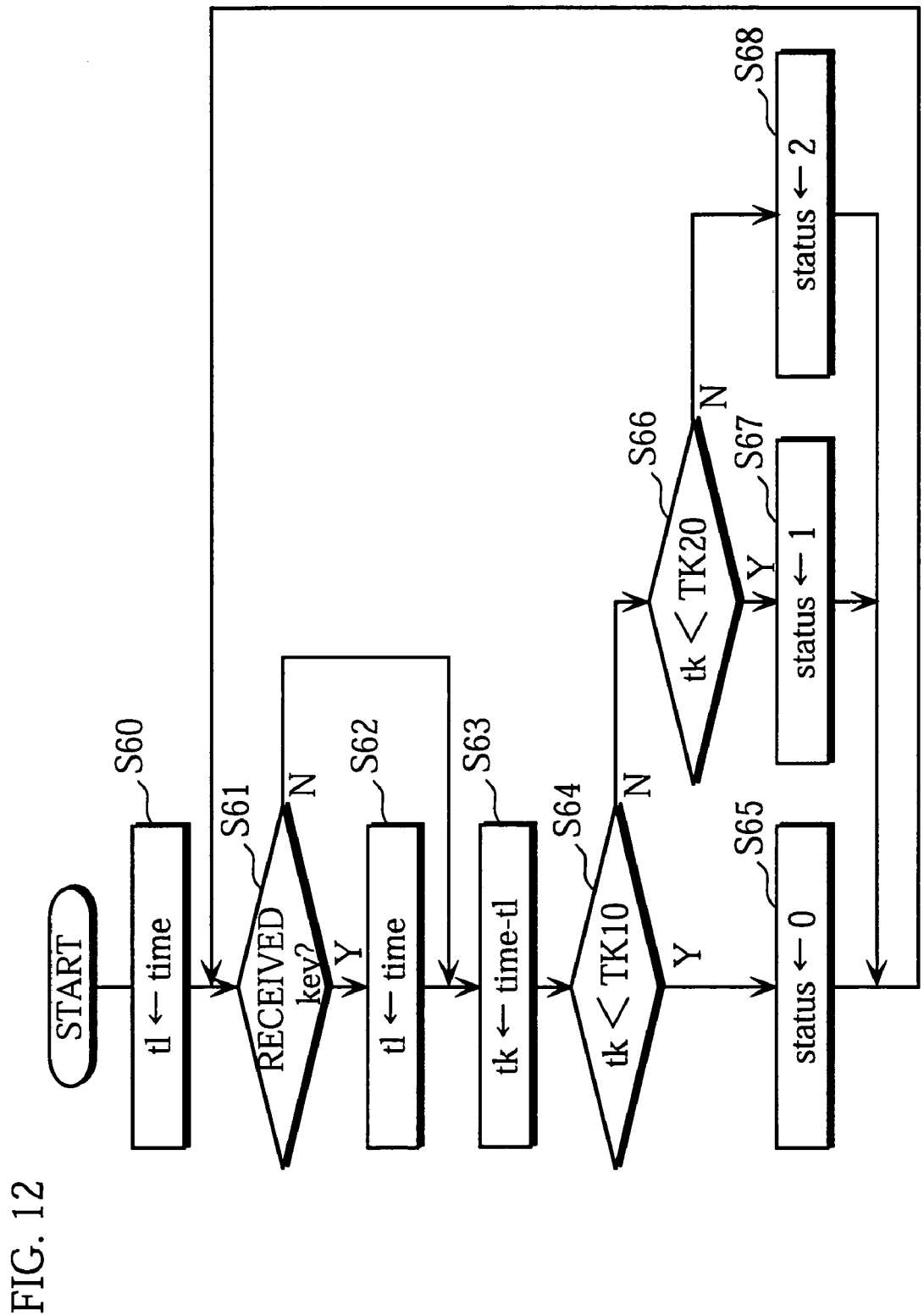
FIG. 12 is a flowchart showing processing performed in the second embodiment by the non-operational status detecting unit to set a non-operational status.

FIG. 12 shows a flowchart for status setting processing performed by the operation status detecting unit 62. A program having the processing content shown in the flowchart is activated when a terminal is switched on. Firstly, the operation status detecting unit 62 performs initialization by storing the time that the program was activated in storage areas (FIG. 10) corresponding to reception times t1 in the status storage table 621 (step S60).

Next, the operation status detecting unit 62 searches the buffer memory, and checks whether a piece of operation information 'key' exists (step S61). If such a piece of operation information exists, the operation status detecting unit 62 updates the reception time t1 in the status storage table 621 to the current time (step S62). If not, step S62 is skipped, and the operation status detecting unit 62 finds an elapsed time tk by subtracting the reception time t1 from the current time, and updates the elapsed time in the status storage table 621 (step S63).

Following this, the operation status detecting unit 62 updates the status in the status storage table 621, according to the duration of the elapsed time tk. If the elapsed time tk is less that the first reference time TK10 (step S64, Yes), the status is set at '0' (step S65), if the elapsed time tk is no less than the first reference time TK10, and less than the second reference time TK20 (step S66, Yes), the status is set at '1' (step S67), and if the elapsed time is no less than the second reference time TK20 (step S66, No), the status is set at 2 (step S68).

The above processing (steps S61 to S68) is repeated in extremely short periods.

Figure 13:
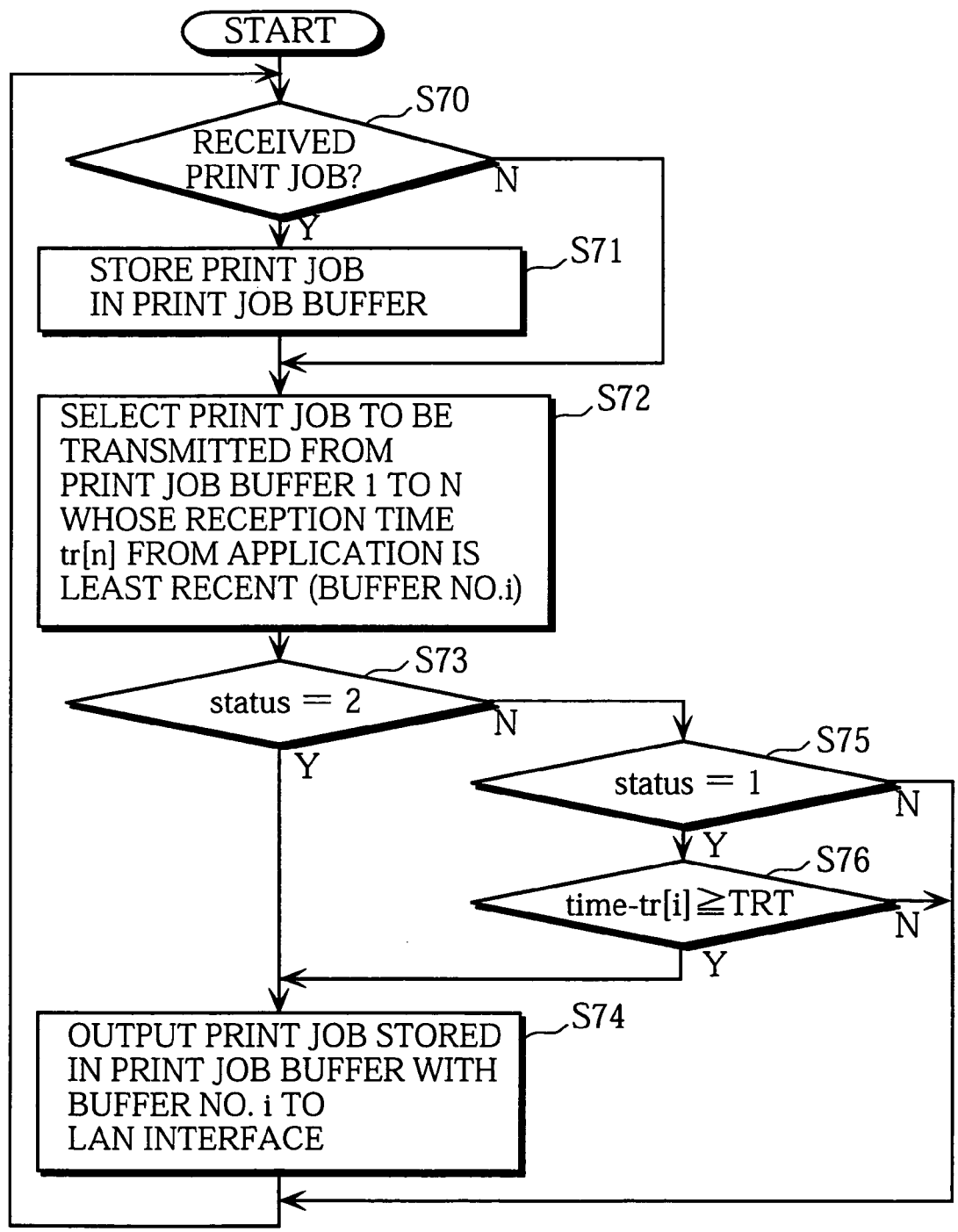
FIG. 13 is a flowchart showing processing performed in the second embodiment by a print job processing unit to determine the timing for outputting print jobs to a LAN interface.

FIG. 13 is a flowchart relating to the timing of output of print jobs to the LAN interface 64 by the print job processing unit 63. First, upon receiving a print job input from the application 52 (FIG. 9) (step S70, Yes), the print job processing unit 63 stores the print job and the other necessary items referred to above in the print job buffer 631 (step S71).

Then, the print job processing unit 63 decides that a print job stored in the print job buffer 631 that has the earliest reception time tr (in other words that was received the longest time before) is to be transmitted to the printer server (output to the LAN interface 64) (step S72), and checks the status stored in the status storage table in the status detecting unit 62.

When the status is '2' (step S73, Yes), the print job processing unit 63 outputs the print job to the LAN interface 64 (step S74).

When the status is '1' (step S75, Yes), the print job processing unit 63, only when a specified time TRT has passed since the reception time tr of the print job (step S76, Yes), outputs the print job to the LAN interface 64 (step S74). If the specified time TRT has not passed (step S76, No), the print job processing unit 63 postpones output of the print job to the LAN interface 64 (step S74 is skipped, and control returns to step S70).

If the status is '0' (step S75, No), the print job processing unit 63 postpones output of the print job to the LAN interface 64 (step S74 is skipped, and control returns to step S70).

Third Embodiment

Figure 14:
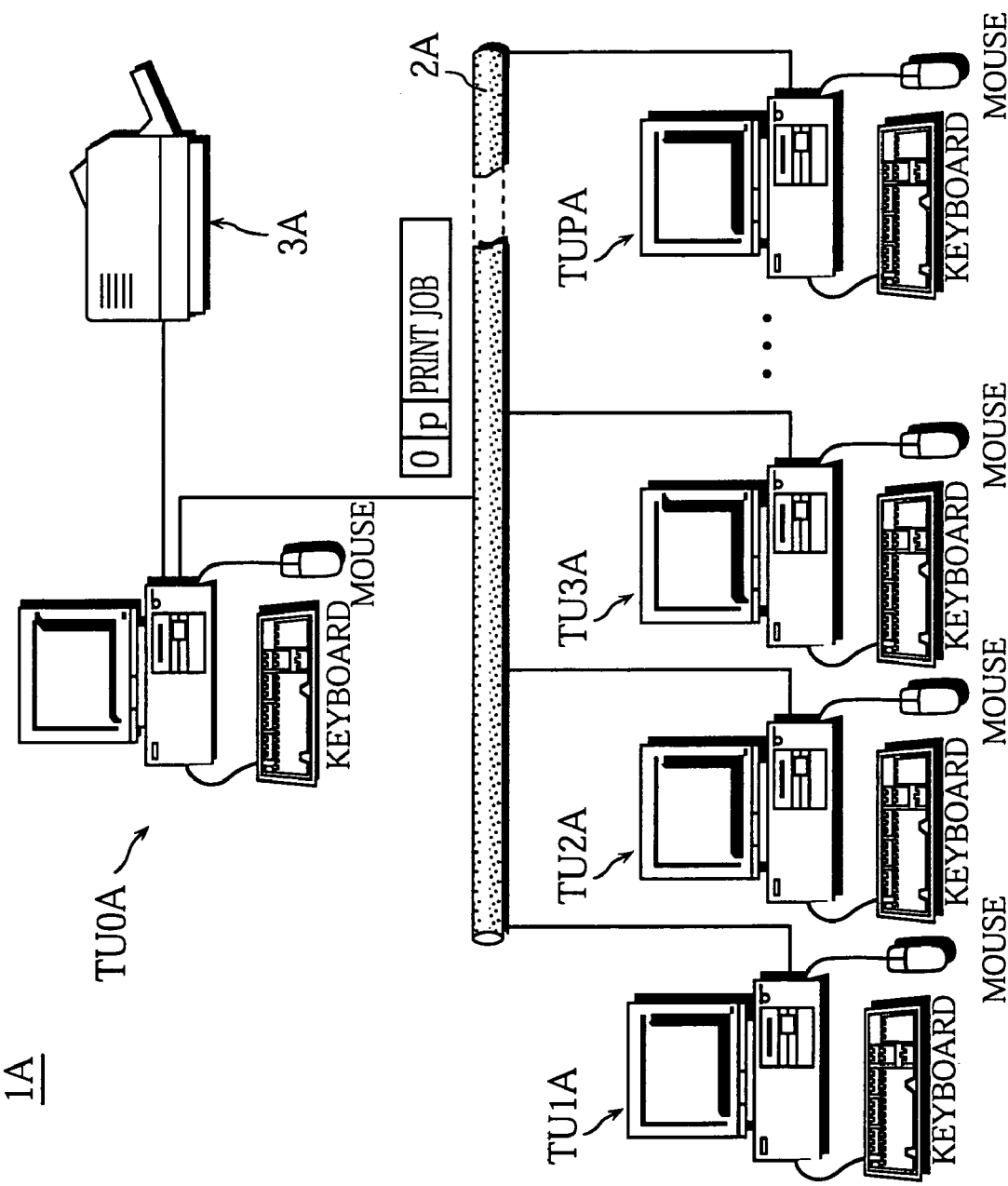
FIG. 14 shows an overall structure for a printer system in a third embodiment.

FIG. 14 shows a structure of a printer system 1A having a printer server TU0A in a third embodiment.

The printer system 1A includes a plurality of personal computers (TU0A to TUPA), having a mouse and keyboard for input of data, that are connected via a LAN 2A compliant with the Ethernet standard. One of the plurality of personal computers is connected to a printer 3A, and used as the specialized print server TU0A. The other personal computers TULA to TUPA are used as terminals for creating documents and the like.

A number of terminals P (P being an integer of 2 or more) having a same structure are installed. Each terminal (TULA to TUPA) is identified by a terminal number 1, 2, 3, . . . , p, . . . P. Furthermore, the printer server TU0A is assigned an identification number '0'.

Upon receiving a print instruction via the input means, a terminal attaches a destination ID number (here, an ID number '0' for the printer server TU0A) and a terminal number 'p', indicating the terminal performing transmission, to an indicated print job, and transmits the print job to the LAN interface 2A.

Figure 15:
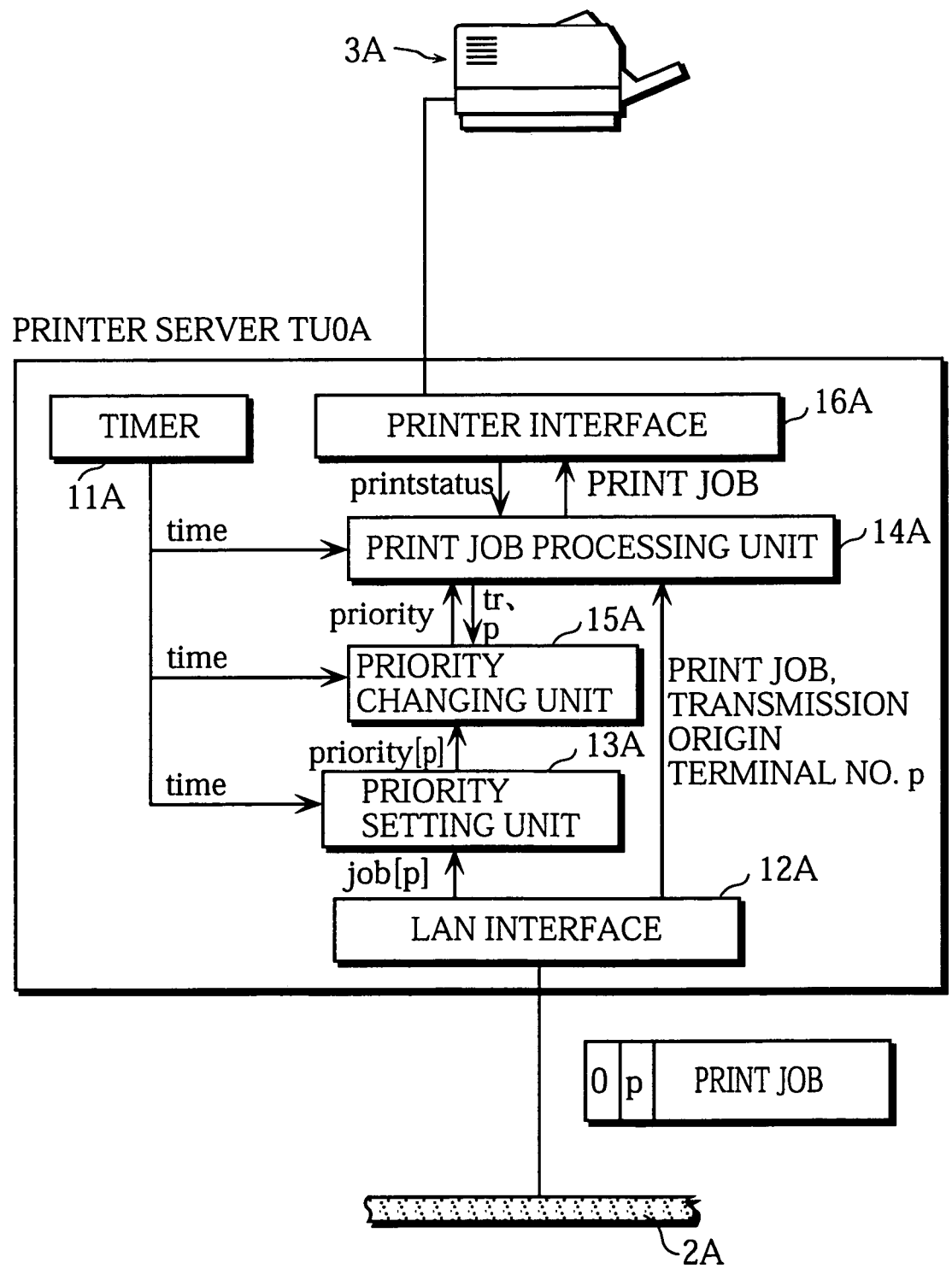
FIG. 15 is a block diagram of a printer server in the third embodiment.

FIG. 15 is a block diagram showing the printer server TU0A. In the drawing, the printer server TU0A includes a timer 11A, a LAN interface 12A, a priority setting unit 13A, a print job processing unit 14A, a priority changing unit 15A, and a printer interface 16A.

The timer 11A shows a current time. The timer 11A is referred to by the priority setting unit 13A, the print job processing unit 14A, and the priority changing unit 15A, when necessary.

The LAN interface 12A selects and receives data addressed to itself, in other words data destined for the printer server TU0A, from data transmitted from the terminals TULA to TUPA to the LAN 2A. When the transmitted data is a print job, the LAN interface 12A outputs the print job with attached terminal number to the print job processing unit 14A, and generates a code 'job' as information showing that a print job has been received from a terminal with the terminal number p, before outputting the code with attached terminal number as a piece of reception information 'job p' to the priority setting unit 13A.

The priority setting unit 13A has a priority storage table 131A, as shown in FIG. 16. The priority storage table 131A stores, in correspondence with each of terminal numbers 1A to PA, a time t1 at which a piece of reception information 'job p' was last output from the LAN interface 12A, a time tk that has expired since the reception time t1, and a priority level determined according to the length of the elapsed time.

The priority setting unit 13A includes a buffer memory (not shown) for temporarily storing pieces of reception information 'job p' input from the LAN interface 12A. The priority setting unit 13A searches the buffer memory in a specific extremely short period, and detects whether a piece of reception information 'job p' is stored in the buffer for each of the terminal numbers 1A to PA in turn.

If a piece of reception information 'job p' is detected, the priority setting unit 13A refers to the timer 11A, and stores the current time as the reception time t1 of the print job in a storage area of a corresponding terminal number in the priority storage table 131A (updates the reception time t1), while deleting the reception information 'job p' from the buffer memory.

If a piece of reception information 'job p' is not stored for a particular terminal, the priority setting unit 13A refers to the timer 11A, and calculates the elapsed time tk by subtracting the current time from the reception time t1 stored in correspondence with the terminal number for the terminal. The calculated elapsed time tk is then stored in a corresponding storage area (the elapsed time tk is updated). Therefore, the elapsed time tk indicates the time that has passed since a print job was last received, in other words the elapsed time since a most recent print job was received from the corresponding terminal.

Furthermore, the priority setting unit 13A updates the reception time t1 and the elapsed time tk, as well as updating a priority level indicated by one of the numerical values '0', '1', and '2'. When the elapsed time tk is shorter than a first reference time TK1, the priority setting unit 13A sets the status at '0'. When the elapsed time t1 is no less than the first reference time TK1 and less than a second reference time TK2, the priority setting unit 13A sets the status at '1', and when the elapsed time t1 is no less than the second reference time TK2, at '2'. Here, TK1<TK2, and TK1 and TK2 are set, for example, at 1 minute and 5 minutes respectively.

Since in the case of a terminal with the priority level '2' a considerable time (at least 5 minutes) has passed since an operator made a print instruction, the possibility that the operator has left their seat to go and collect the printed document from the printer 3A is considered to be high. In the case of a terminal with the priority level '0', on the other hand, only a short time has passed since an operator made a print instruction, so the operator is here judged to be more likely to be continuing work such as creation of a document than is the operator of the terminal with the priority level '2'. Therefore, even if print processing of a print job from such a terminal is performed and the printed document produced by the printer 3A, the printed document is considered likely to be left uncollected. Furthermore, when a terminal has a priority level of '1', it is considered to be in an intermediate state, and so the operator of such a terminal is judged to be fairly likely to have gone to collect the printed document.

Here, in the present embodiment, operators of terminals with higher priority levels are assumed to be in more of a hurry to obtained the printed document, and thus, in the processing performed by the print job processing unit 14A (described hereafter) print jobs from such terminals are given preference over print jobs from terminals with a lower priority level.

Figure 17:
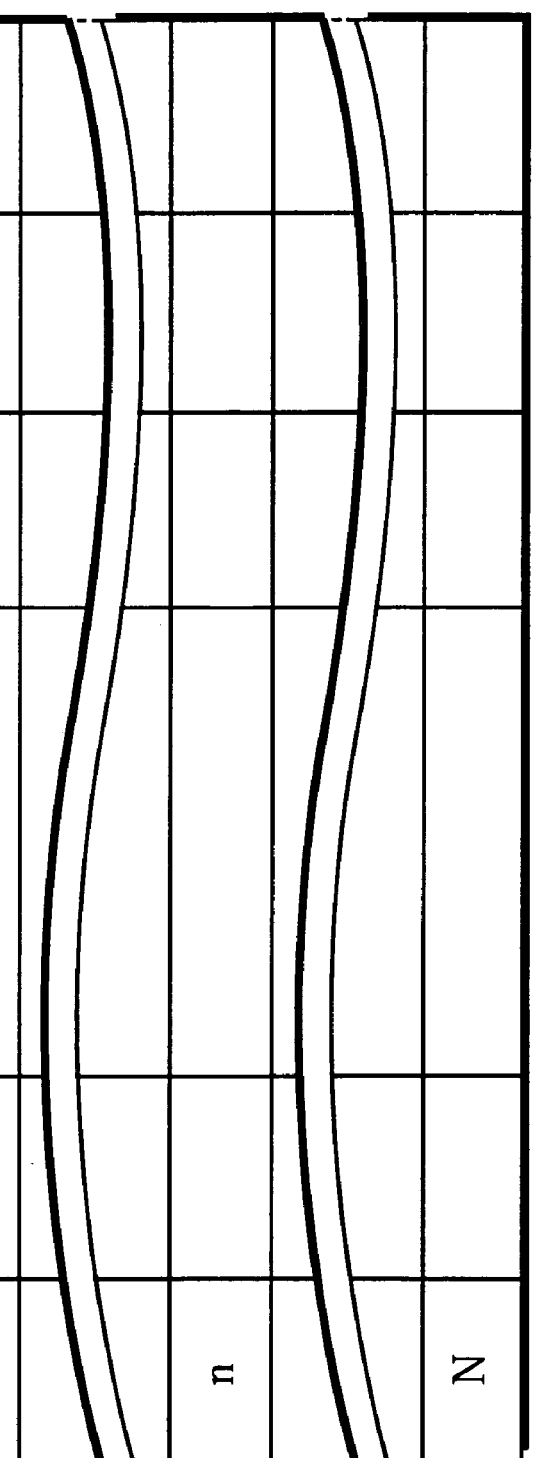
FIG. 17 shows a print job buffer in the third embodiment.

The print job processing unit 14A has a print job buffer 141, as shown in FIG. 17. Print jobs input from the LAN interface 12A are temporarily stored in the print job buffer 141A. Each print job is stored in a vacant buffer area (a buffer area whose flag is set as OFF) having a lowest buffer number out of storage areas identified by buffer numbers 1 to N (N being a positive integer). Here, the print job processing unit 14A stores a terminal number transmitted together with the print job, and a time (tr) at which the print job was received in a storage area corresponding to the buffer number, and sets a flag corresponding to the buffer number at ON. The time (tr) is obtained by referring to a time output from the timer 11A when the print job is input into the print job processing unit 14A.

As a rule, priority levels stored in the priority storage table 131A that correspond to terminal numbers p stored in the terminal number storage area are stored in the priority storage area in the print job buffer 141A without any alteration. However, in specific circumstances, the priority level of the priority storage table 131A is raised by 1, and the resulting value stored.

The processing for raising the priority level is performed by the priority changing unit 15A. When the printer 3A is available to perform print processing, the print job processing unit 14A outputs pairs of terminal numbers p and times tr stored in the print job buffer 141A in order from the lowest buffer number, to the priority changing unit 15A, and instructs the priority changing unit 15A to change the priority levels of the output terminal numbers p, if such is required. Then, the print job processing unit 14A stores priority levels changed by the priority changing unit 15A, or unaltered priority levels, in priority storage areas of corresponding buffer numbers. The change processing performed by the priority changing unit 15A is described later in this specification.

Furthermore, the print job processing unit 14A refers to priority levels stored in the print job buffer 141A, and determines the next print job for which print processing is to be performed. This is also explained in more detail later in this specification.

Upon receiving a priority changing instruction with a paired terminal number p and reception time tr from the print job processing unit 14A, the priority changing unit 15 determines the priority level of the terminal with the terminal number p from the priority level stored in the priority storage table 131A of the priority setting unit 13A. The priority changing unit 15A subtracts the reception time tr from a current time obtained from the timer 11A to calculate the time that has elapsed since the reception time. When the calculated elapsed time is shorter than a specified time TRS, the priority level of the terminal p stored in the priority storage table 131A is output without alteration to the print job processing unit 14A. On the other hand, if the elapsed time is at least as long as the specified time TRS, 1 is added to the priority level of the terminal p and the resulting value output to the print job processing unit 14A as the priority level.

As explained above, if the basic principle of this embodiment that print processing is performed giving priority to terminals with a high priority level determined by the length of time that has expired since a most recent print reception time is applied, the priority level stored in the priority storage table 131A may be used without alteration as the priority level of the print job buffer 141A. However, it is not thought desirable for print jobs for which a specified time TRS has expired since reception from the printer server TU0A to be left waiting for printing for too long. As a result, the priority levels in the priority storage table 131A, in other words the priority levels set for each terminal, are not used without alteration. Instead, a value corresponding to the priority level plus 1 is stored in the print job buffer 141A as the priority level. Consequently, the priority levels stored in the print job buffer 141A may have values corresponding to the priority levels 0 to 2 used in the priority storage table 131A without alteration, or to these priority levels plus 1, so the priority levels stored in the print storage buffer 141A may be 0, 1, 2, or 3. Note that the specified time TRS is set at, for example, 10 minutes.

Once the printer server 3A is available for printing, determination of the priority level of each print job stored in the print job buffer 141A has been completed by the priority changing unit 15A, and the priority levels in the print job buffer 141A updated, the print job processing unit 14A determines the next print job to be processed based on the priority levels.

First, the print job processing unit 14A searches for a print job with the highest priority level '3'. This search is performed on buffer numbers whose flags are set at ON in the print job buffer 141A, in order from a lowest buffer number. Once a print job with a priority level '3' has been found, the print job is output to the printer interface 16A, and the corresponding flag set at OFF.

If the print job processing unit 14A searches as far as a last buffer number N without finding a print job with the priority level '3', it lowers the target priority level to '2', and performs an identical search. Following this, the print job processing unit 14A lowers the priority level one level at a time, and performs a search, outputting relevant print jobs to the printer interface 16A and setting corresponding flags to OFF.

The printer interface unit 16A outputs a print job input by the print job processing unit 14A to the printer 3A. The printer interface 16A monitors the processing state of the printer 3A, and outputs a print status signal to the print job processing unit 14A. If the printer 3A is currently printing a document, the print status signal is a BUSY signal, and once printing has been completed and the print 3A available for printing, the BUSY signal is switched to a READY signal. Therefore, the print job processing unit 14A judges whether the printer 3A is available to process a new print job by checking the print status signal.

Figure 18:
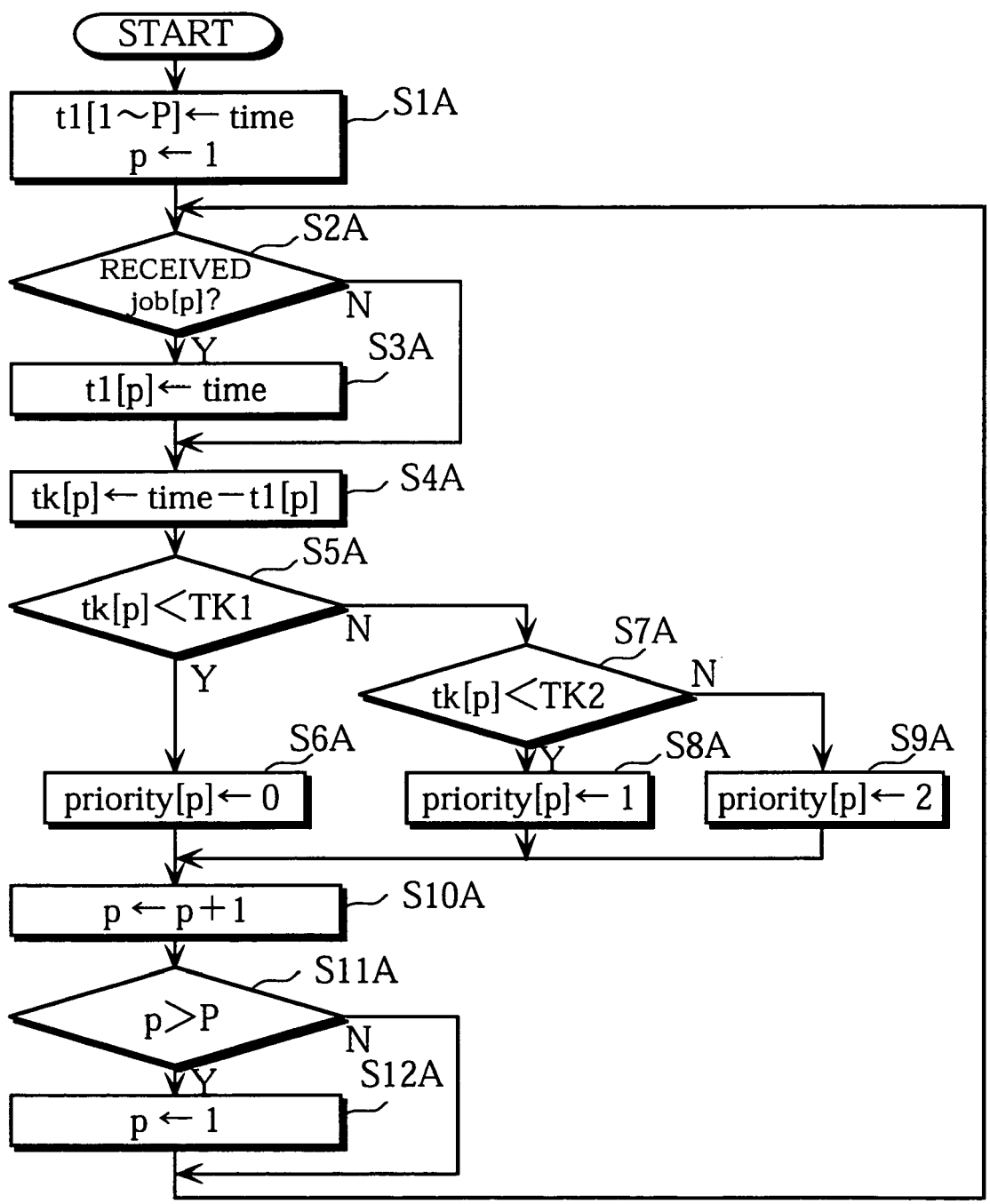
FIG. 18 is a flowchart showing processing performed in the third embodiment by a priority setting unit to set priority levels.

FIG. 18 is a flowchart showing processing for setting priority levels performed by the priority setting unit 13A. A program whose processing content is shown in the flowchart is activated when the printer server TU0A is switched on. Firstly, the priority setting unit 13A performs initialization by storing the time that the program was activated in storage areas (FIG. 16) corresponding to reception times t1 for all terminal numbers in the status storage table 131A, and storing a value '1' as a variable 'p' specifying a search target in the buffer memory (i.e. a terminal number) (step S1A).

Next, the priority setting unit 13A searches the buffer memory, and checks whether a piece of reception information 'job 1' for the terminal number 1 (p=1) exists (step S2A). If such a piece of reception information exists, the priority setting unit 13A updates the reception time t1 for the terminal number 1 in the priority storage table 131A to the current time (step S3A). If not, step S3A is skipped, and the priority setting unit 13A finds an elapsed time tk by subtracting the reception time t1 from the current time, and updates the elapsed time for the terminal number 1 in the priority storage table 131A (step S4A).

Following this, the priority setting unit 13A updates the priority level of the terminal number 1 in the priority storage table 131A, according to the duration of the elapsed time tk for the terminal number 1. If the elapsed time tk is less that the first reference time TK1 (step S5A, Yes), the priority level is set at '0' (step S6A), if the elapsed time tk is no less than the first reference time TK1, and less than the second reference time TK2 (step S7A, Yes), the priority level is set at '1', and if the elapsed time is no less than the second reference time TK1 (step S7A, No), the priority level is set at 2 (step S9A).

The above processing (steps S2A to S9A) is repeated for terminal numbers as far as a terminal number P (step S10A). Once processing for the terminal number P has been completed (step S1A, Yes), the priority setting unit 13A sets the variable 'p' at '1' (step S12A). In this way, updating of priority levels can be achieved for terminal numbers 1 to P. The repetition of the processing for each terminal number is set to be performed in an extremely short period.

Figure 19:
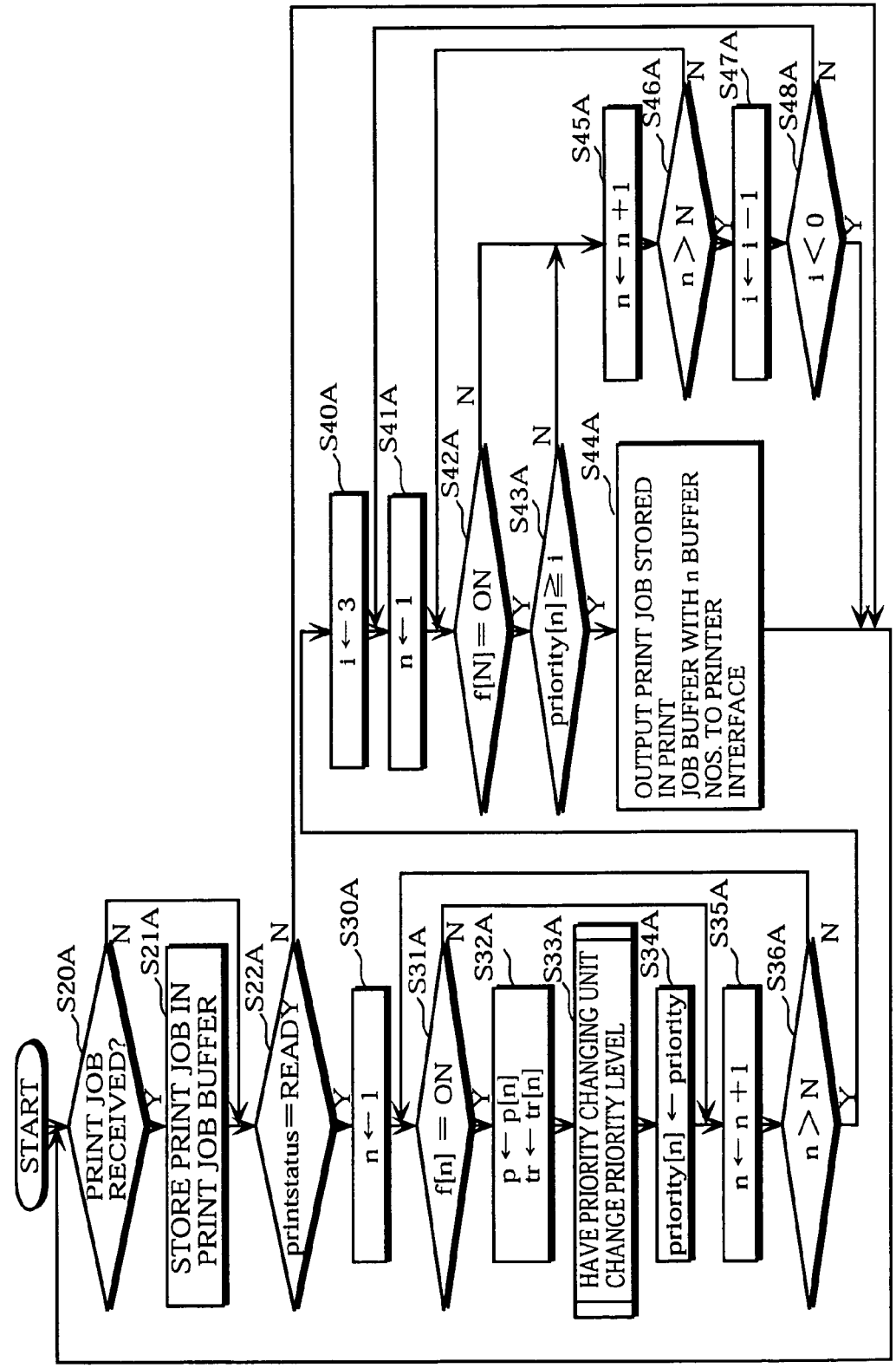
FIG. 19 is a flowchart showing processing performed in the third embodiment by the print job processing unit to store print jobs in the print job buffer, and determine a next print job to be performed from among the stored print jobs.

FIG. 19 is a flowchart showing processing, performed by the print job processing unit 14A, for storing print jobs in the print job buffer 141A, and determining which of the stored print jobs is the next to be processed.

The processing shown in the flowchart of FIG. 19 can be broadly divided into print job storing processing (steps S20A to S21A), priority updating processing of the print job buffer 141A (steps S30A to S36A), and processing for determining the next print job to be performed (steps S40A to S48A).

First, upon receiving a print job input from the LAN interface 12A (FIG. 15) (step S20A, Yes), the print job processing unit 14A stores the print job and the other necessary items referred to above in the print job buffer 141A (step S21A).

Then, print job processing unit 14A checks whether the print status signal from the printer interface 16A (FIG. 15) is a BUSY signal or a READY signal (step S22A). If the print status signal is a BUSY signal (step S22A, No), control returns to step S20A, and if it is a READY signal (step S22A, Yes), moves to the priority updating processing (steps S30A to S36A).

In the priority updating processing, the print job processing unit 14A first stores a value '1' as a variable 'n' that specifies a terminal number in the print job buffer 141A that is to be updated (step S30A). Then, the print job processing unit 43 determines whether a flag for the buffer number 1 (n=1) is set at ON (step S31A).

If the flag is not ON (step S31A, No), the print job processing unit 14A increments the variable 'n' by 1, thereby specifying a different terminal number for updating. If the flag is ON, however (step S31A, Yes), the print job processing unit 14A continues on to step S32A.

At step S32A, the print job processing unit 14A outputs a terminal number p and a reception time tr stored in the storage area with the buffer number n to the priority changing unit 15A, and has the priority changing unit 15A determine a priority level (step S33A).

Figure 20:
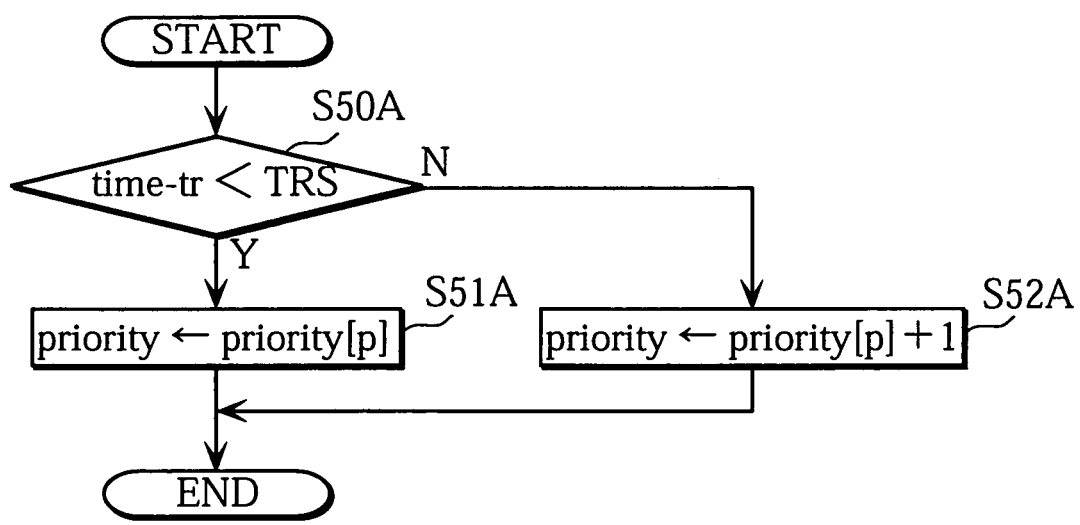
FIG. 20 is a flowchart showing processing performed by a priority changing unit in the third embodiment to change priority levels.

FIG. 20 is a flowchart showing priority determining processing performed by the priority changing unit 15A. The priority changing unit 15A first determines whether an elapsed time between a reception time tr input from the print job processing unit 14A and a current time is shorter than a specified period TRS (step S50A).

If the elapsed time is shorter (step S50A, Yes), the priority changing unit 15A outputs a priority level corresponding to a terminal number p input from the print job processing unit 14A (a priority level stored in the priority storage table 131A) without alteration to the print job processing unit 14A as a priority level (step S51A). If the elapsed time is not shorter (step S50A, No), the priority changing unit 15A outputs, to the print job processing unit 14A, a value obtained by adding 1 to the priority level corresponding to the terminal number p input from the print job processing unit 14A as the priority level (step S52A).

To return to FIG. 19, the print job processing unit 14A stores the priority level input from the priority changing unit 15A in a storage area in the print job buffer 141A that corresponds to the terminal number p (step S34A).

Following this, the processing of steps S31A to S35A is repeated for each buffer number in turn, thereby enabling the priority levels of buffer numbers storing print jobs to be updated. Once processing has been completed as far as buffer number N (step S36A, Yes), control moves to print job determining processing (steps S40A to S48A).

First, the print job processing unit 14A stores a value 3 in a variable 'i' specifying a priority level (step S40A), and in order starting from buffer number 1 (step S41A, S45A), determines whether buffer numbers with flags set at ON (step S42A, Yes), have a priority level of '3' or more (i=3) (step S43A).

Then, the print job processing unit 14A outputs a print job having a buffer number that was the first to be determined to have a priority level of at least '3 ' to the printer interface 16A (step S44A). Note that the print status signal is a BUSY signal from the start of print processing performed following output of the print job via the printer interface 16A to the printer 3A, and the end of the print processing. Consequently, during this period the print job processing unit 14A can only execute processing for storing print jobs.

If the print job processing unit 14A searches as far as the buffer number N (step S46A, Yes), but finds no buffer number with a priority level of 3 or more, the priority level 'i' is lowered one level at a time (step S47A), and the same processing as above performed for each priority level (steps S41A to S46A).

If a corresponding print job cannot be found even by lowering the priority level to the lowest level of 0 (step S48A, Yes), in other words, if no print jobs are stored in the print job buffer 141A, control returns to step S20A, and waits for a print job to be input.

As explained above, in the printer server TU0A of this embodiment, high priority levels are set for terminals for which a longer time has expired since receipt of a most recent print job. Then, when the printer 3A is available to perform processing, and a plurality of print jobs are waiting to be printed, print jobs from terminals with higher priority levels are normally given preference over terminals with lower priority levels, when determining the next print job to be processed.

As a result, regardless of the order in which print jobs were received by the printer server TU0A or the number of print jobs stored in the print job buffer 141A, preference is given to print jobs produced by operators of terminals with high priority levels over print jobs produced by operators of terminals with low priority levels. In other words, print jobs produced by users who are considered as having gone to collect the printed document from the printer (users who are in a hurry to perform print processing) are given preference over print jobs produced by users who are considered likely to be still at their desks creating a document or the like (users who are in no particular hurry to perform print processing).

Fourth Embodiment

The following is an explanation of a printer system 1B in a fourth embodiment.

Figure 21:
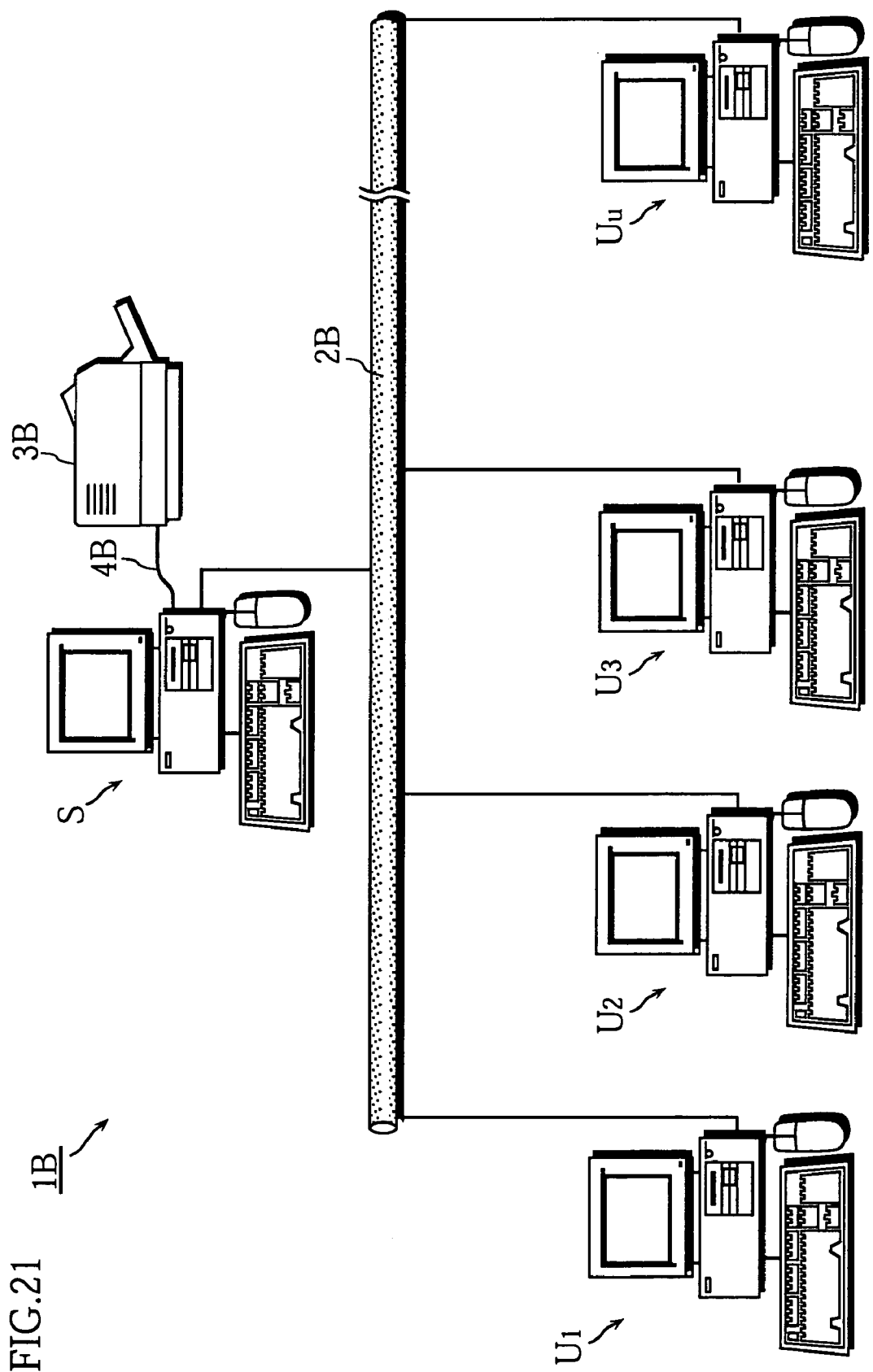
FIG. 21 shows an overall structure of a print system 1B in a fourth embodiment.

FIG. 21 is a drawing showing the overall structure of printer system 1B. As shown in the drawing, the printer system 1B includes a LAN 2B, a plurality of terminals U1 to Uu connected to the LAN 2B, a printer server S connected to the plurality of terminals via the LAN 2B so that two-way communications can be performed, and a printer 3B connected to the printer server S via a printer cable 4B.

The terminals U1 to Uu and the printer server S each include a personal computer main unit including a hard disk, a monitor, keyboard, mouse, and the like connected to the main unit, an operating system (OS), compatible with the network, that has already been installed in the hard disk, and a printer driver. Furthermore, applications such as word processing software and image processing software have been installed in each of the terminals U1 to Uu. The printer server S uses a printer sharing service provided by the OS to enable the printer 3B to be used by all the terminals U1 to Uu.

The terminals U1 to Uu and the printer server S have each already been assigned a unique IP address. This IP address identifies the origins and destinations of packets transmitted via the LAN. Furthermore, the terminals U1 to Uu have each been assigned a unique ID number. The printer server S includes a conversion table storing IP addresses and ID numbers for each of the terminals U1 to Uu in correspondence. Packets received are identified as having been received from one of the terminals U1 to Uu using this conversion table.

The printer 3B is a model well-known in the art, including an interface (not shown) compatible with the IEEE (Institute of Electrical and Electronics Engineers) standard 1284, and an image forming unit (not shown). The printer 3B transmits a print status signal indicating whether it is currently performing print processing via the print cable 4B to the print server S. A print status of 'BUSY' (H level) indicates that the printer 3B is performing print processing, while a print status 'READY' (L level) indicates that it is possible for the printer 3B to receive a new print job.

Figure 22:
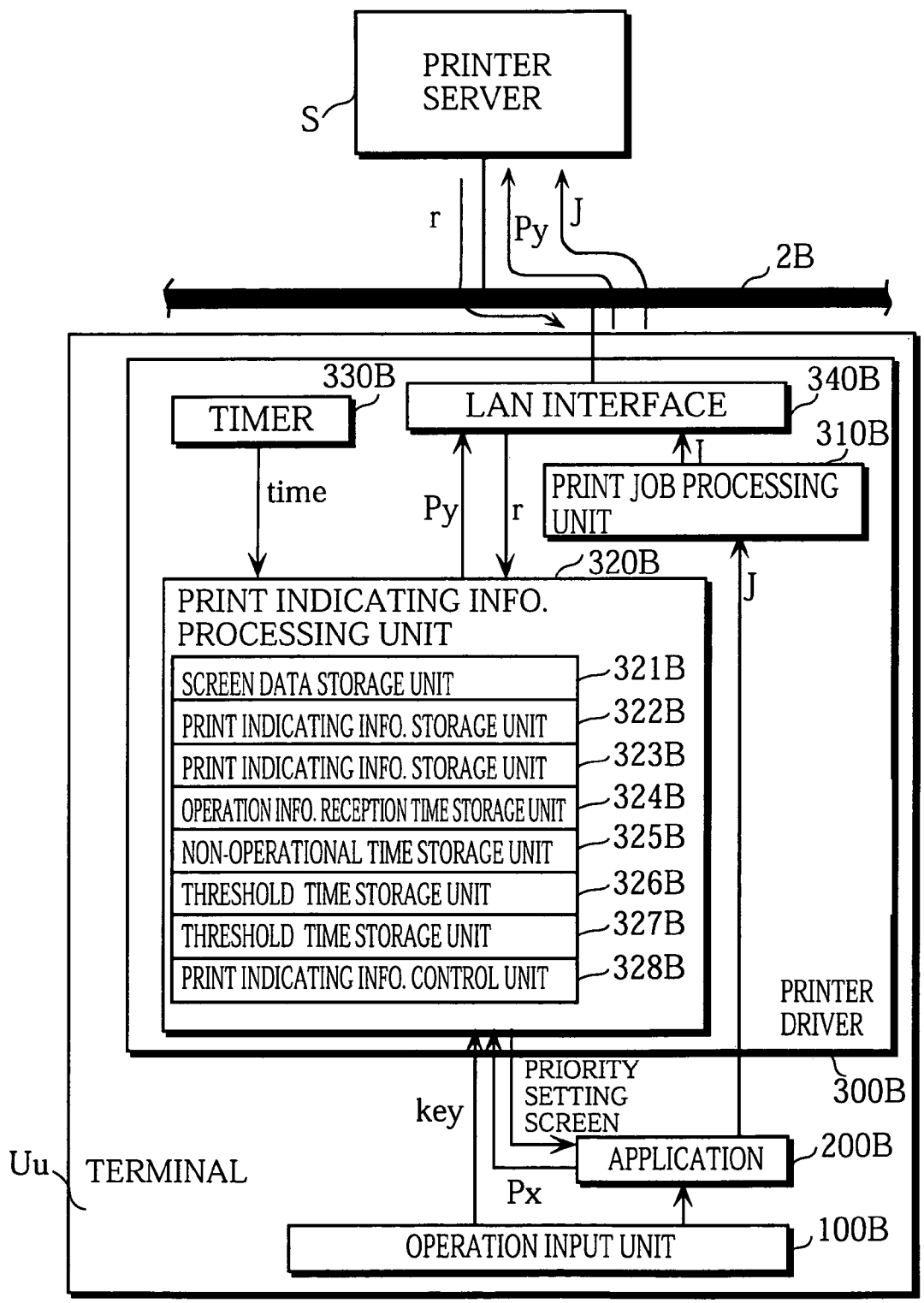
FIG. 22 is a block diagram showing a structure of terminals $U_1$ to $U_u$ shown in FIG. 21.

FIG. 22 is a block diagram showing the structure of terminals U1 to Uu. Since terminals U1 to Uu have the same structure, the structure of the terminal Uu is shown as a representative example in the drawing.

Each terminal U1 to Uu includes an operation input unit 100B, an application 200B such as a word processing program, and a printer driver 300B. The printer driver 300B includes a print job processing unit 310B, a print indicating information processing unit 320B, a timer 330B, and a LAN interface 340B. Furthermore, the print indicating information processing unit 320B includes an image data storage unit 321B for storing, in advance, image data such as a priority setting screen 3210B, for display on a monitor, a threshold time storage unit 326B for storing, in advance, a specified threshold time TK1 (for example 1 min), a threshold time storage unit 327B for storing, in advance, a specified threshold time (for example 5 mins) longer than the specified threshold time TK1, print indicating information storage units 322B and 323B, a operation information reception time storage unit 324B, a non-operational time storage unit 325B, and a print indicating information control unit 328B. Each of these components is realized by various hardware resources and software resources.

The operation input unit 100B is realized by a keyboard, mouse or similar. When an operator makes an input operation using the keyboard for example, a piece of operation information indicating the content of the input operation is transmitted to the application 200B.

The application 200B generates a print job J including print data such as documents and illustrations, based on pieces of operation information received from the operation input unit 100B. In addition, once an operator has made a print instruction for print job J via the operation input unit 100B, the application 200B transmits the print job J to the print job processing unit 310B. Note that, having transmitted the print job J, the application 200B is immediately released from transmission processing. Therefore, the operator can proceed with creating the next print job using the application 200B.

The print job processing unit 310B temporarily stores the print job J received from the application 200B in an internal buffer (not shown). Following this, the print job processing unit 310B attaches a control code required for control of the printer 3B, reads the print job from the buffer, and transmits it to the LAN interface 340B.

The LAN interface 340B is realized by a LAN board or similar compliant with the Ethernet standard, and stores IP addresses for individual terminals and the printer server S that are required for transmission and reception of various packets. Then, once the print job J has been received from the print job processing unit 310B, the LAN interface 340B transmits a packet including the print job J, to which an IP header indicating a particular terminal as a transmission origin and the printer server S as a destination, is attached.

Furthermore, if the operator calls the printer property from the print screen of the application 200B when making a print instruction for the print job J, and performs an input operation to call the priority setting, the operation input unit 100B transmits this piece of operation information to the print indicating information control unit 328B. Note, that if this kind of input operation is performed from the OS, a piece of operation information is still transmitted to the print indicating information control unit 328B in the same way. Having received the piece of input information, the print indicating information control unit 328B calls the priority setting screen 3210B from the image data storage unit 321B, and displays it on the monitor.

Figure 23:
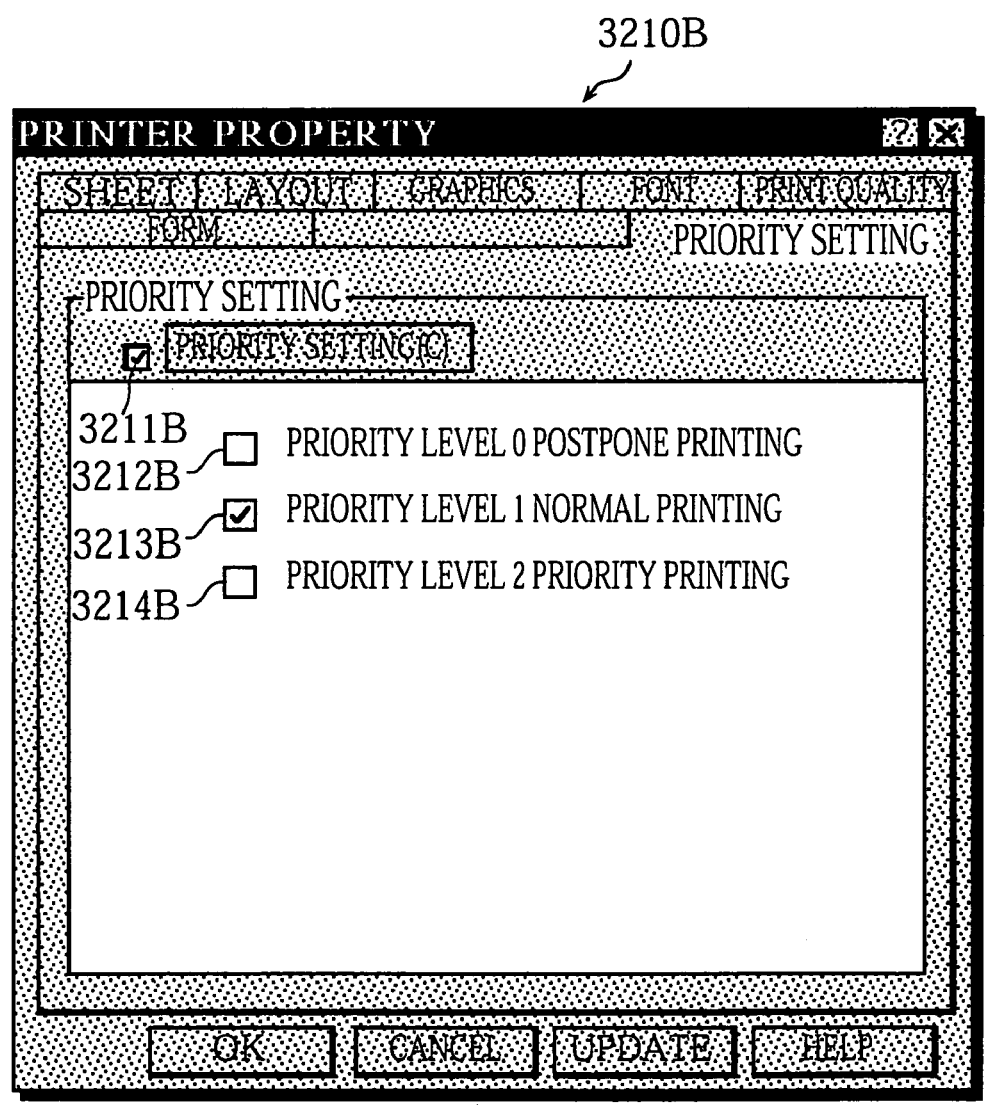
FIG. 23 shows an example of a priority setting screen 3210B displayed by a monitor in the fourth embodiment.

FIG. 23 is an example of the priority setting screen 3210B. The priority setting screen 3210B includes a checkbox 3211B indicating whether a priority level is to be set, a checkbox 3212B setting a priority level '0' indicating printing is to be postponed, a checkbox 3213B setting a priority level '1' indicating printing is to be performed at a normal speed, and a checkbox 3214B setting a priority level '2', indicating printing is to be performed as soon as possible. When setting a priority level, the operator clicks the checkbox 3211B by operating the mouse. Having done this, the operator can then select one of the priority levels 0 to 2, by clicking one of the checkboxes 3212B to 3214B, and then clicking the update button, following by the OK button. Once this is completed, the priority level desired by the operator is set. In this way, a different priority level can be set according to the kind of work being performed by the operator. For example, when the operator is selecting desired images from a font CD one at a time using image processing software, and making a print instruction for each selected image, it is natural that they should go and collect the printed images from the printer once they have all been printed, so the priority level is set at '1', and printing is performed normally. However, when the operator is making a document for a meeting or similar, this document naturally needs to be completed within a limited period of time, and so the priority level in this case is set at '2'. Furthermore, when an operator is creating a confidential document using word processing software, they naturally do not wish other persons to view the printed document, and so in this case, they can first set the priority level at '0' to postpone, and then, when no one is in the vicinity of the printer 3, change the priority level to '2', and have the document printed out immediately.

To return to FIG. 22, once a priority level has been set by an operator using the priority setting screen 3210B, the print indicating information control unit 328B stores this priority level as a piece of print indicating information Px indicating the print priority level in the print indicating information storage unit 322B. Note that if the operator does not set a priority level, the priority level '1' is set in the print indicating information storage unit 322B as an initial value for the print indicating information Px.

Furthermore, once an input is made into the operation input unit 100B via the keyboard or similar, a piece of operation information 'key', indicating that the operator has made an operation of the keyboard or mouse, is transmitted to the print indicating information processing unit 320B. The piece of operation information 'key' indicates that a terminal is currently being operated by an operator.

The timer 330B outputs time information indicating a current time to the print indicating information unit 320B.

Upon receiving the piece of operation information 'key' from the operation input unit 100B, the print indicating information control unit 328B stores a piece of time information received from the timer 330B as an operation information reception time tlu in the operation information reception time storage unit 324B (updates information stored in the operation information reception time storage unit 324B).

The print indicating information control unit 328B subtracts the reception time tlu stored in the operation information reception time storage unit 324B from a current time received from the timer 330B, and stores the difference in the non-operational time storage unit 325B as a non-operational time tku indicating a period in which the keyboard is not being operated. Therefore, the non-operational time tku indicates a time during which a terminal is non-operational, in other words a time since an input operation was last made into the operation input unit 100B.

Furthermore, when a priority level is set by an operator in using the priority setting screen 3210B, the print indicating information control unit 328B stores a piece of print indicating information Py in the print indicating information storage unit 323B as a return value, the piece of print indicating information Py having a same value, i.e. priority level, as the piece of print indicating information Px. Then the print indicating information control unit 328B, in addition to updating the operation information reception time tlu, and the non-operational time tku, updates the piece of print indicating information Py indicating one of the priority levels '1', '2', and '3'. In other words, the print indicating information Py indicates a priority level which is based on the print indicating information Px shown in the priority setting screen 3210B, but is also influences by the non-operational time tku.

If the print indicating information Px is '0', the print indicating information control unit 328B should preferably postpone printing, so the print indicating information Py is saved as '0' without referring to the non-operational time tku. In contrast, if the print indicating information Px is '1' or '2', the print indicating information control unit 328B sets the print indicating information Py at '1' or '2' without alteration if the non-operational time tku is shorter than the threshold time TK1. Once the non-operational time tku reaches the threshold time TK1, the print indicating information control unit dynamically sets the print indicating information Py at '2' or '3', that is one level higher than the original level. Once the non-operational time tku reaches the threshold value TK2 (TK1<TK2), the print indicating information Py dynamically sets the print indicating information Py at the maximum level '3', by raising it to one level higher than the previous level, if necessary.

Here, the operator of a terminal with print indicating information Py of '1' is judged to still be at their desk performing input operations via the operation input unit 100B. Therefore, even if a print job from this terminal is processed and the printed document produced by the printer 3B, there is a high possibility that the printed document will remain uncollected on the printer tray. In a terminal with print indicating information Py of '3', on the other hand, the non-operational status has been continuing for a while (at least 5 minutes), and it is considered likely that the operator of this terminal has left their seat to go and collect the printed document. Furthermore, a terminal with print indicating information Py of '2' is in an intermediate state, and so the operator of such a terminal is judged to be fairly likely to have gone to collect the printed document.

If basic principle that print jobs from terminals which have been in the non-operational state for longer are given priority when performing print processing is employed, the print indicating information Py may be created by referring to the non-operational time tku and without reference to the print indicating information Px. As a result, operators of terminals high print indicating information Py set at a high value are considered to be more likely to be in a hurry to collect their document. However, here it is thought preferable to take the content of the work being performed by the operator into consideration. Consequently transmission to the print server S is performed by executing the following processing on a piece of print indicating information Py. This piece of print indicating information Py is formed by taking the print indicating information Px as a basis, and adding '1' or '2' to this value, depending on the length of the non-operational time tku for the terminal concerned.

Furthermore, upon receiving a piece of print indicating information r with an attached IP header having the printer server S (via the LAN 2B) as the transmission origin and the terminal as the destination, the LAN interface 340B transmits the piece of print indicating information r to the print indicating information processing unit 320B.

Upon receiving the piece of print indicating information r from the LAN interface 340B, the print indicating information control unit 328B in the print indicating information processing unit 320B transmits the piece of print indicating information Py currently stored in the print indicating information storage unit 322B to the LAN interface 340B. Note that a detailed description of the control operation performed by the print indicating information control unit 328B is made later in this specification.

Upon receiving the piece of print indicating information Py from the print indicating information processing unit 320B, the LAN interface 340B attaches an IP header, indicating the terminal as a transmission origin and the printer server S as a destination, to the piece of print indicating information Py, and transmits the resulting packet to the LAN 2B.

Figure 24:
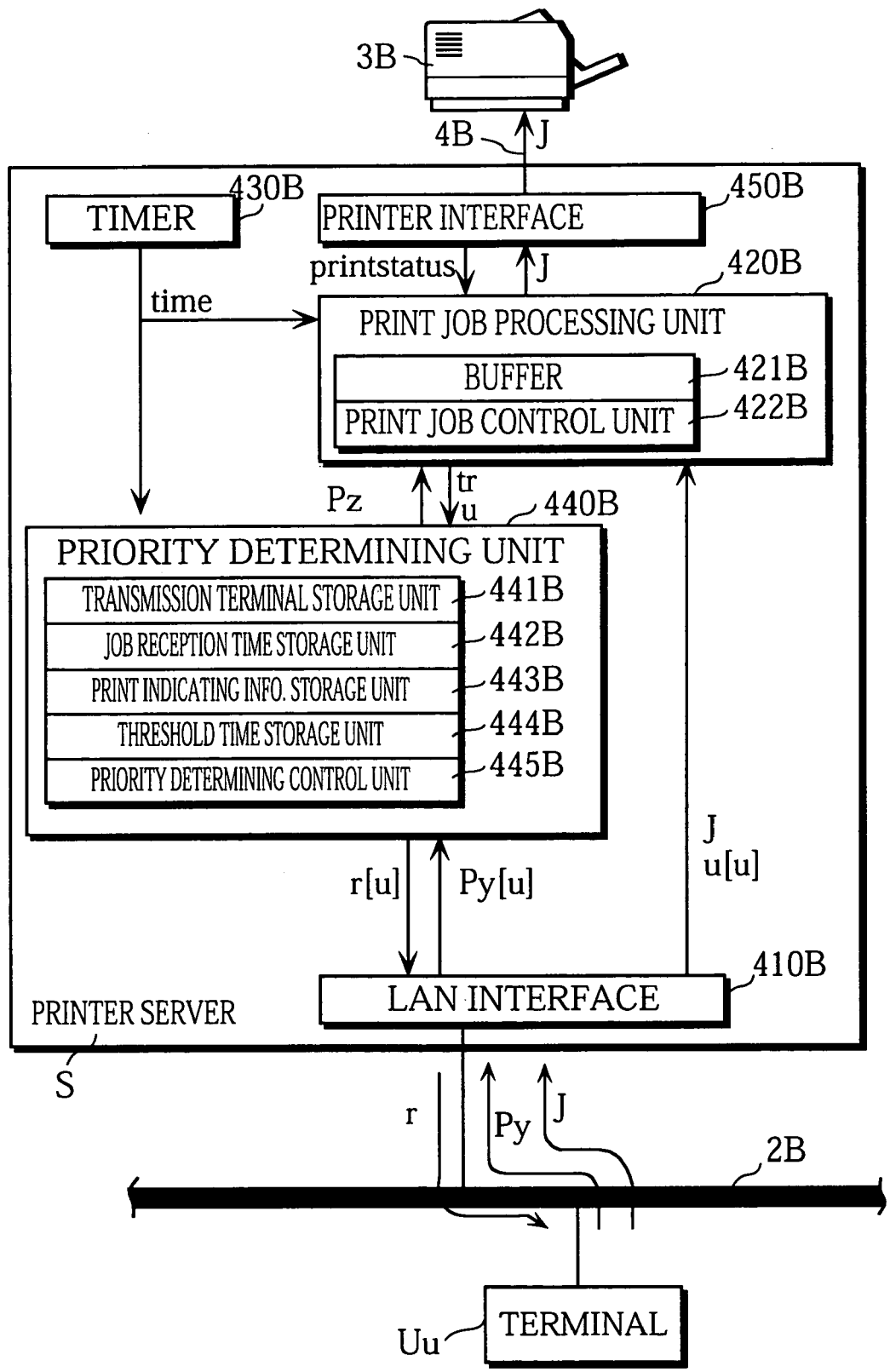
FIG. 24 is a block diagram showing a structure of a printer server S shown in FIG. 21.

FIG. 24 is a block diagram showing a structure of the print server S. As shown in the drawing, the printer server S includes a LAN interface 410B, a print job processing unit 420B, a timer 430B, a priority determining unit 440B, and a printer interface 450B. The print job processing unit 420B includes a buffer 421B, and a print job control unit 422B. The priority setting unit 440B includes a transmitting terminal number storage unit 441B, a job reception time storage unit 442B, a print indicating information storage unit 443B, a threshold time storage unit 444B for prestoring a threshold time TR (for example 10 minutes), and a priority determining control unit 445B. Each of these components is realized by various hardware and software resources.

The LAN interface 410B is realized by, for example, a LAN board compliant with the Ethernet standard or similar. The LAN interface 410B holds IP addresses for the terminals U1 to Uu and the printer server S, these IP addresses being required for transmission and reception of packets, and a conversion table for converting IP addresses for terminals U1 to Uu into terminal numbers for terminals U1 to Uu, and vice versa. Then the LAN interface 410B uses the conversion table to identify from the IP address of the received packet which of the terminals U1 to Uu is the transmission origin of the transmitted packet, as well as identifying a print job J or similar that forms the body of the packet. In the drawing, the letter 'u' shown in brackets is a variable indicating the terminal number.

If the body of the received packet is identified as the print job J, the LAN interface 410B transmits the print job J, and the terminal number 'u' indicating the terminal number of the transmission origin of the packet to the print job processing unit 420B.

The timer 430B outputs time information showing a current time to the print job processing unit 420B, and the priority setting unit 440B.

Upon receiving the print job J from the LAN interface 410B, the print job control unit 422B stores the print job J in a buffer 421B shown in FIG. 25. The print job is stored in a vacant buffer area (a buffer area whose flag f[n] is set as OFF) having a lowest buffer number out of storage areas identified by buffer numbers 1 to N (N being a positive integer). Here, the print job processing unit 420B stores a terminal number u [u] transmitted together with the print job, and a reception time tr [n] obtained by referring to time information from the timer 430 in correspondence with the print job, and sets a flag f [n] corresponding to the buffer storage area at ON.

When the printer 3B is available to perform print processing, the print job processing unit 420B outputs pairs of terminal numbers u[u] and times tr[n] stored in the print job buffer 421 in order from the lowest buffer number, to the priority determining unit 440B, and instructs the priority determining unit 440B to determine a piece of print indicating information Pz showing the priority level of the output terminal number u[u]. Then, the piece of print indicating information Pz[n] determined by the priority determining unit 440B is stored in a priority level storage area for a corresponding buffer number.

The processing performed by the priority determining unit 440B to determine the piece of print indicating information Pz, and the meaning of 'print indicating information Pz' are dealt with later in this specification. Furthermore, the print job processing unit 420B refers to priority levels stored in the print job buffer 431B, and determines the next print job for which print processing is to be performed. This is also explained in more detail later in this specification.

The printer interface 450B is realized by an interface compatible, like interface of the printer 3B, with the IEEE 1284 standard. The printer interface 450B outputs a piece of print status information input from the printer 3B to the print job processing unit 420B.

Furthermore, when the print status received from the printer interface 450B changes from printing (BUSY) to available for printing (READY) the print job control unit 422B informs the priority determining unit 440B of the terminal number U[n] of the transmitting terminal, and the job reception time tr[n] for each print job J stored in the buffer 421B, and has the priority determining unit 440B determine a piece of print indicating information Pz[n] for each print job. Then, having received notification of a piece of print indicating information Pz[n] determined by the priority determining unit 440B, the print job control unit 422B stores the piece of print indicating information Pz[n] in a priority level storage area for a corresponding buffer number. The processing for determining priority levels performed by the priority determining unit 440B is described later in this specification. Then, the print job control unit 422B refers to the priority level stored in the buffer 421B and determines the next print job to be processed. This is also explained in more detail hereafter.

Having receiving notification of a transmission origin terminal number U[n] and a job reception time tr[n] from the print job control unit 422B, the priority determining control unit 445B stores the received terminal number U[n] and reception time tr[n] respectively in transmission origin terminal number storage unit 441B and the job reception time storage unit 442B, as well as transmitting the transmission origin terminal number u to the LAN interface 410B, and instructing it to transmit a piece of print indicating information r to the terminal concerned.

Upon receiving this instruction, the LAN interface 410B uses the conversion table to set the IP address of the received transmission origin terminal number as the destination, and the printer server S as the transmission origin, and transmits a piece of print indicating information r[u] with an attached header containing this information. Then, the LAN interface 410B transmits a piece of print indicating information Py[u] received from the destination terminal in response to the piece of print indicating r[u] to the priority determining unit 440B.

The priority determining control unit 445B stores the piece of print indicating information Py received from the LAN interface 410B in the print indicating information storage unit 443B. Then, the priority determining control unit 445B calculates the difference between the time information received from the timer 430B, and the reception time tr stored in the job reception time storage unit 442B (current time—tr), in other words the length of time that has expired with the print job remaining unprocessed, and determines a piece of print indicating information Pz[n], or information showing priority level, based on the elapsed time and the print indicating information Py.

If the elapsed time is shorter than the threshold time TR, the priority determining unit 440B uses the piece of print indicating information Py as the piece of print indicating information Pz[n] without alteration. If, on the other hand, the elapsed time is at least as great as the threshold time TR, the priority determining unit 440B adds 1 to the piece of print indicating information Py and informs the print job control unit 422B of the resulting value as the piece of print indicating information Pz[n].

As explained above, if the basic principle of this embodiment is followed, preference is given to print jobs with longer non-operational times, this being determined based on values set by the operator of each terminal. In this case, a piece of print indicating information Py may be used as a piece of print indicating information Pz[n] without alteration. However, it is not considered desirable for too long a time to have expired since a print job was received from the printer server S, and so in the case of print jobs for which a fixed time (TR) has expired since reception, 1 is added to the original value of corresponding pieces of print indicating information Py to form the piece of print indicating information Pz[n], rather than the pieces of print indicating information Py being used without alteration.

The unaltered values of the print indicating information Py '0' to '3', and the values of print indicating information Py to which 1 has been added represent priority levels. As a result, the print indicating information Pz[n] can have a value of '0', '1', '2', '3' or '4'. Note that when a piece of print indicating information Py is '0', a value of '0' is used even if the elapsed time is at least as great as the threshold time.

Once the print job control unit 422B receives information indicating that the printer 3B is available for printing from the printer interface 450B, the priority determining unit 440B completes determination of pieces of print indicating information Py, and these are updated to pieces of print indicating information Pz, the print job control unit 422B determines the next print job to be processed based on the pieces of print indicating information Pz.

The print job control unit 422B first searches for a print job with the highest priority level '4'. This search is performed on buffer numbers in the buffer 421B whose flag is set at ON, starting from the lowest relevant buffer number. If a print job with the priority level '4' is discovered, the print control unit 422B outputs the print job to the printer interface 450B, and switches the corresponding flag to OFF. If the print job control unit 422B searches as far as buffer number N without finding a print job with the priority level '4', the priority level is lowered to '3', and the same search performed. Following this, the priority level is lowered one level at a time, and when a print job is found, the print control unit 422B outputs it to the printer interface 450B, and switches the corresponding flag to OFF. Note, that since printing is postponed for the priority level '0', this priority level is not the subject of a search.

The printer interface 450B outputs a print job received from the print job processing unit 420B to the printer 3B.

Having received the print job, the printer 3B changes the print status to BUSY, and executes print processing, reproducing an image on paper. Then, once printing has been completed, the printer 3B changes the print status to READY.

Next, control operations performed by the print indicating information control unit 328B in each of the terminals U1 to Uu, and control operations performed by the print job control unit 422B and the priority determining control unit 445B in the printer server S are explained in sequence.

Figure 26:
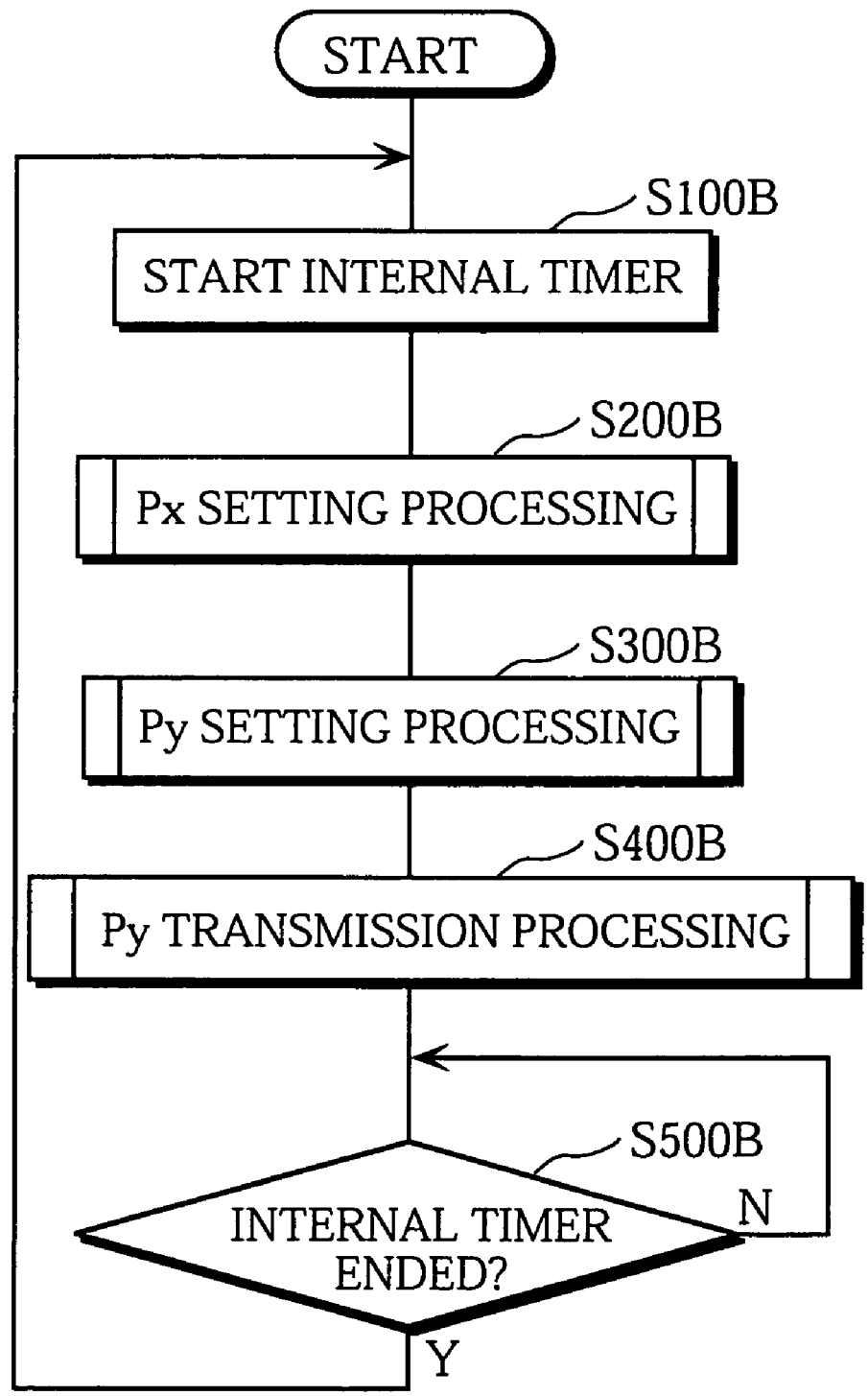
FIG. 26 is a flowchart showing a main routine executed by a print indicating information control unit 328B in the fourth embodiment.

FIG. 26 is a flowchart showing a main routine executed by the print indicating information control unit 328B.

Once a terminal is switched on, the print indicating information control unit 328B executes initialization processing, starts an internal timer (not shown) (step S200B) and performs time management of the main routine (step S500B). Then the following three sets of processing are repeated in sequence, each processing being performed for a fixed period. First, the print indicating information control unit 328B receives a setting from an operator and sets a piece of print indicating information Px (step S200B). Next, the print indicating information control unit 328B calculates a piece of print indicating information Py based on the piece of print indicating information Px and a piece of operation information 'key' (step S300B). Then, when a piece of print indicating information r is received, the print indicating information control unit 328B transmits a current piece of print indicating information Py (step S400B).

Figure 27:
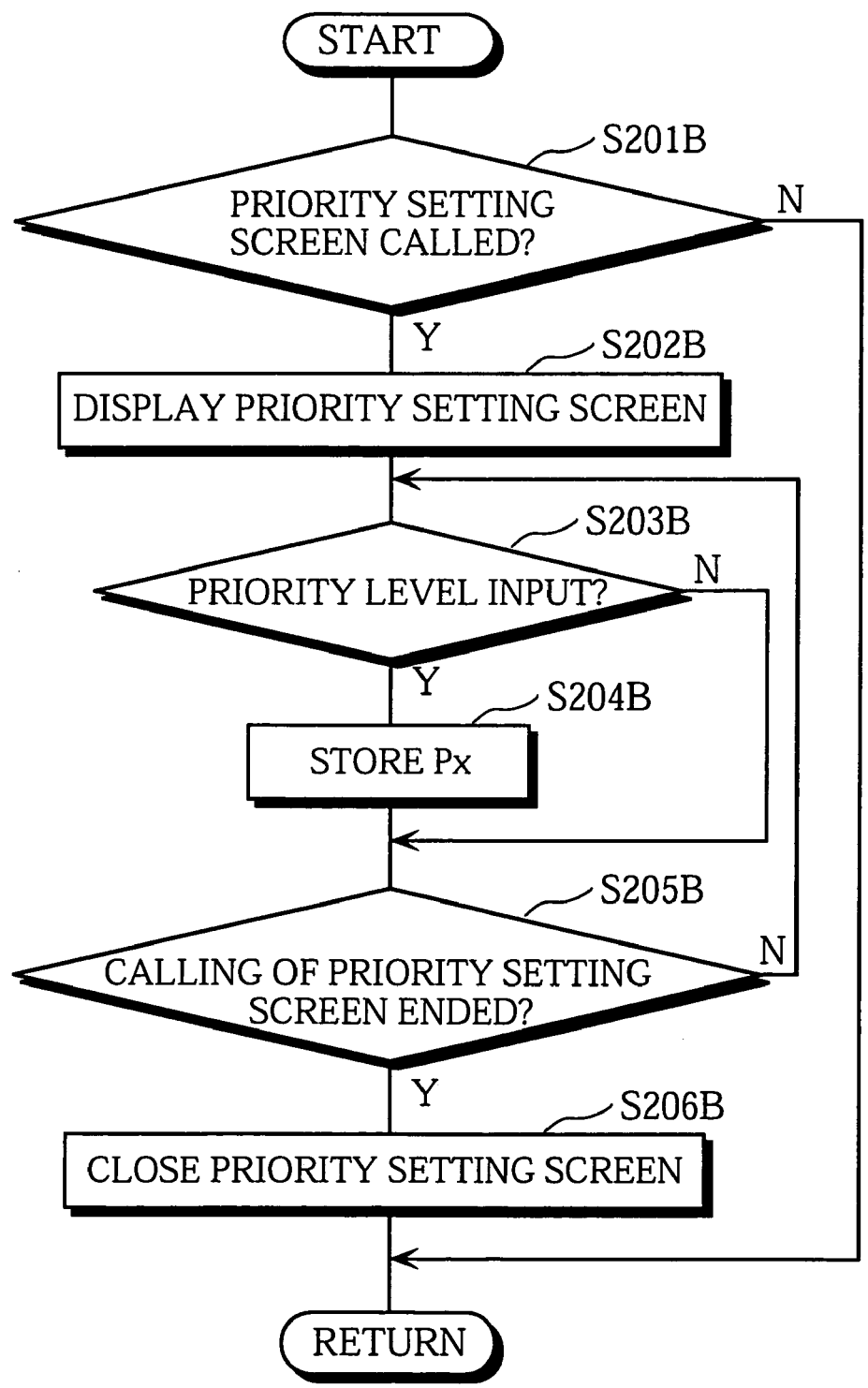
FIG. 27 is a flowchart showing a subroutine for processing that sets print indicating information Px shown in step S200B of FIG. 26.

The following is an explanation of the above setting, calculating, and transmitting processes. FIG. 27 is a flowchart showing a subroutine for the setting processing of step S200B in FIG. 26.

The print indicating information control unit 328B first judges whether a priority setting screen 3201B has been called (step S201B). If so (step S201B, Y), the print indicating information control unit 328B reads the priority setting screen 3201B shown in FIG. 23 from the image data storage unit 321B, and transmits it to the application 200B to have it displayed on the terminal monitor (step S202B). Then, the print indicating information control unit 328B judges whether the operator has checked the checkbox 3211B, and input one of the priority levels '0' to '2' (step S203B).

If one of the priority levels has been input (step S203, Y), the print indicating information control unit 328B stores the input priority level in the print indicating information storage unit 322B as a piece of print indicating information Px (step S204B), and control moves to step S205B. If a priority level '0' to '2' is not input at step S203B (step S203B, N), step S204B is skipped, and control moves to step S205B.

At step S205B, the print indicating information control unit 328B waits for calling of the priority setting screen 3210B to be completed. If calling is not completed (step S205B, N), control returns to step S203B. If, in contrast, calling has been completed (step S205B, Y), the print indicating information control unit 328B closes the priority setting screen 3210B (step S206B), and control returns to the main routine of FIG. 26.

If the priority setting screen 3210B is not called at step S201B (step S201B, N), steps S202B to S206B are skipped, and control returns to the main routine of FIG. 26.

By performing the above processing, a same priority level may be set for each application such as word processing software or image processing software, and then these priority levels can be reset as necessary. Note that if the priority level is set at '0' at steps S202B and S203B, and then reset at '1' or '2' by calling the priority setting screen 3210B when print processing is performed by the printer 3B, the reset priority level becomes valid.

Figure 28:
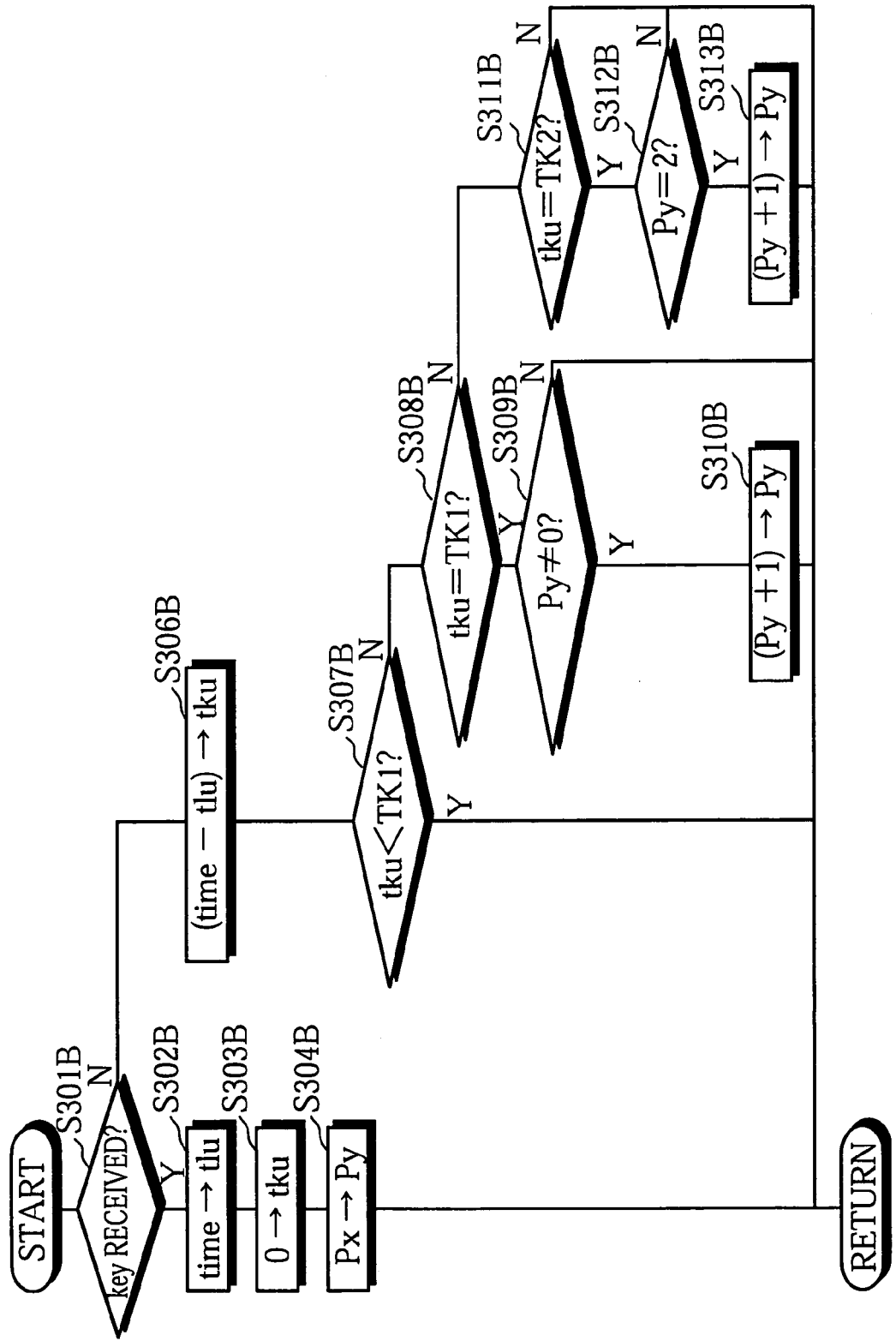
FIG. 28 is a flowchart showing a subroutine for processing that calculates print indicating information Py shown in step S300B of FIG. 26.

FIG. 28 is a flowchart showing a subroutine performing processing to calculate pieces of print indicating information Py shown in step S300B of FIG. 26.

The print indicating information control unit 328B first judges whether a piece of operation information 'key' has been received from the input operation unit 100B (step S301B).

If the piece of operation information 'key' has been received (step S301B, Y), the print indicating information control unit 328B stores time information received from the timer 330B in the operation information reception time storage unit 324B as a operation information reception time tlu (Step S302B). Then, the print indicating information control unit 328B resets the non-operational time tku in the non-operational time storage unit 325B at '0' (step S303B). Following this, the print indicating information control unit 328B sets a piece of print indicating information Py from the print indicating information storage unit 323B as an initial value for a piece of print indicating information Px stored in the print indicating information storage unit 322B (step S304B), and control returns to the main routine of FIG. 26.

If, however, a piece of operation information 'key' is not received at step S301B (step S301B, N), the print indicating information control unit 328B calculates the difference between the current time shown by time information received from the timer 330B and stores the last operation information reception time tlu in the operation information reception time storage unit 324B (current time−tlu), and the calculated time stored in the non-operational storage unit 325B (step S306B). Then, the print indicating information unit 328B judges whether the non-operational time tku is less than a threshold time TK1 (step S307B).

If the non-operational time tku is less than the threshold time TK1 (step S307B, Y), control returns to the main routine of FIG. 26. In contrast, if the non-operational time tku is not less than the threshold time TK1 (step S307B, N), the print indicating information control unit 328B judges whether the non-operational time tku and the threshold time TK1 are equal (step S308B). If the values are equal (step S308B, Y), the print indicating information control unit 328B judges whether the piece of print indicating information Py is '0' (step S309B). If the piece of print indicating information Py is not '0', in other words if it is '1' or '2', the print indicating information control unit 328B increments the piece of print indicating information Py stored in the print indicating storage unit 323B by 1, in other words raises the priority level by 1, and control returns to the main routine of FIG. 26. If, however, the print indicating information is '0' at step S309B, step S310B is skipped and control returns to the main routine of FIG. 26.

Furthermore, if the non-operational time tku exceeds the threshold time TK1 at step S308B (step S308B, N), and the print indicating information control unit 328B judges that the non-operational time tku is equal to the threshold time TK2 (step S311B, Y), and that the piece of print indicating information Py is '2' (step S312B, Y), the print indicating information control unit 328B then increments the piece of print indicating information Py stored in the print indicating information storage unit 323B by 1, that is raises it to a priority level of '3', and controls returns to the main routine of FIG. 26. In contrast, when the non-operational time tlu is greater than the threshold time TK2 at step S311B, or the piece of print indicating information Py is '3', step S313B is skipped and control returns to the main routine of FIG. 26.

In other words, if the print indicating information Px is '0', the print indicating information Py is saved as '0' without reference to the non-operational time tku. If, however, the print indicating information is '1' or '2', the print indicating information control unit 328B raises the value of the print indicating information Py by 1 to '2' or '3' when the non-operational time tku reaches the threshold time TK1, and raises the value of print indicating information Py with a value of '2' to '3' when the non-operational time tku reaches the threshold time TK2. On the other hand, if the operator operates the keyboard or similar, print indicating information Py that has been raised to a priority level of '2' or '3' is lowered to the original value '1' or '2' shown by the print indicating information Px.

Figure 29:
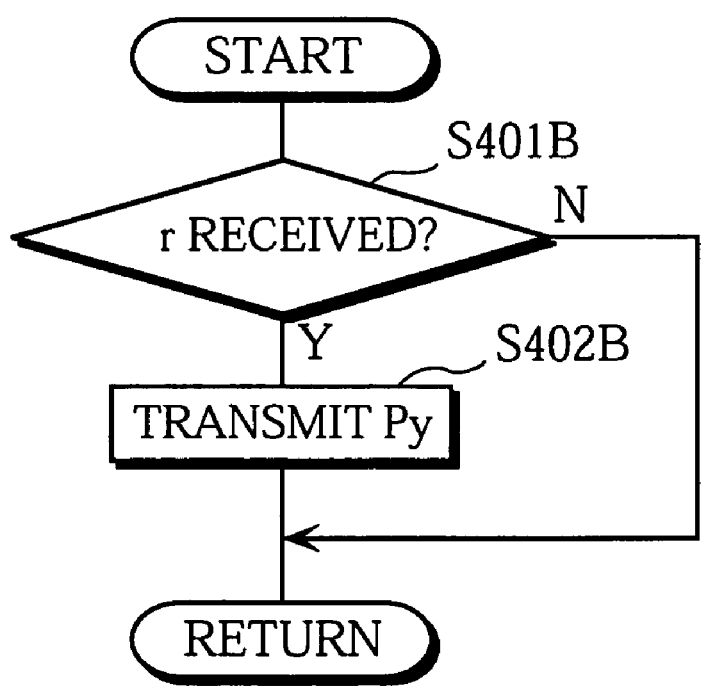
FIG. 29 is a flowchart showing a subroutine for processing that transmits print indicating information Py shown in step S400B of FIG. 26.

FIG. 29 is a flowchart showing a subroutine for processing transmitting a piece of print indicating information Py shown in step S400B of FIG. 26.

The print indicating information control unit 328B judges whether a piece of print indicating information r has been received from the LAN interface 340B (step S401B). Having received the piece of print indicating information r (step S401B, Y), the print indicating information control unit 328B reads a piece of print indicating information Py stored in the print indicating information storage unit 323B, transmits the read piece of print indicating information Py to the LAN interface 340B (step S402B), and control returns to the main routine of FIG. 26. Then, the LAN interface 340B transmits a packet to the printer server S, the packet having the piece of print indicating information Py as a body, and an attached header containing IP addresses specifying the terminal concerned as the transmission origin, and the printer server S as the destination. Therefore, the printer server S is able to receive the most recent piece of print indicating information Py that is influenced by the non-operational time tku. In contrast, if a piece of print indicating information is not received at step S401 (step S401B, N), step S402B is skipped, and control returns to the main routine of FIG. 26. Therefore, each terminal U1 to Uu only transmits a piece of print indicating information Py to the printer server S when receiving a piece of print indicating information r from the printer server S. Consequently, the most recent piece of print indicating information Py can be transmitted with only a small communication load being required between the terminal and the printer server S.

Figure 30:
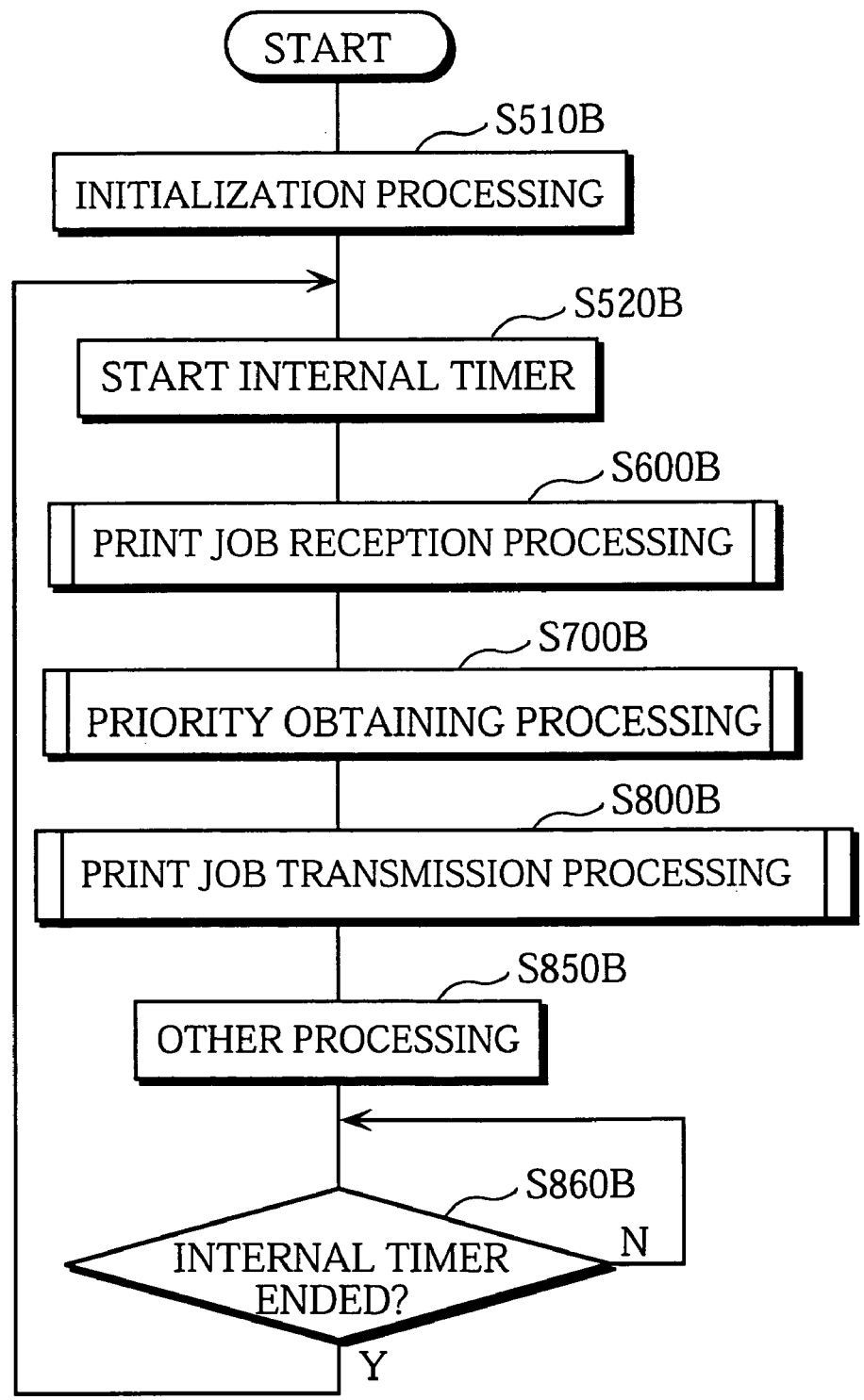
FIG. 30 is a flowchart showing a main routine executed by a print job control unit 422B in the fourth embodiment.

Next, the control operations of the print job control unit 422B, and the priority setting control unit 445B are explained. FIG. 30 is a flowchart showing a main routine executed by the print job control unit 422B.

The printer server S is switched on, and the print job control unit 422B executes initialization processing such as initialization of the buffer 421B (step S510B). Then, the print job control unit 422B starts an internal timer (not shown) (step S520B), and performs the time management of the main routine (step S860B). Next, the print job control unit 422B repeats the following processing, with each processing performed in a specific period: print job reception processing for receiving print jobs from terminals U1 to Uu (step S600B), priority obtaining processing for obtaining priority levels for unprocessed print jobs stored in the buffer 421B (step S700B), print transmission processing for transmitting an unprocessed print job stored in the buffer 421B to the printer interface 450B (step S800B), and other processing (step S850B).

The following is a detailed explanation of the print job reception processing, the priority obtaining processing, and the print job transmission processing.

Figure 31:
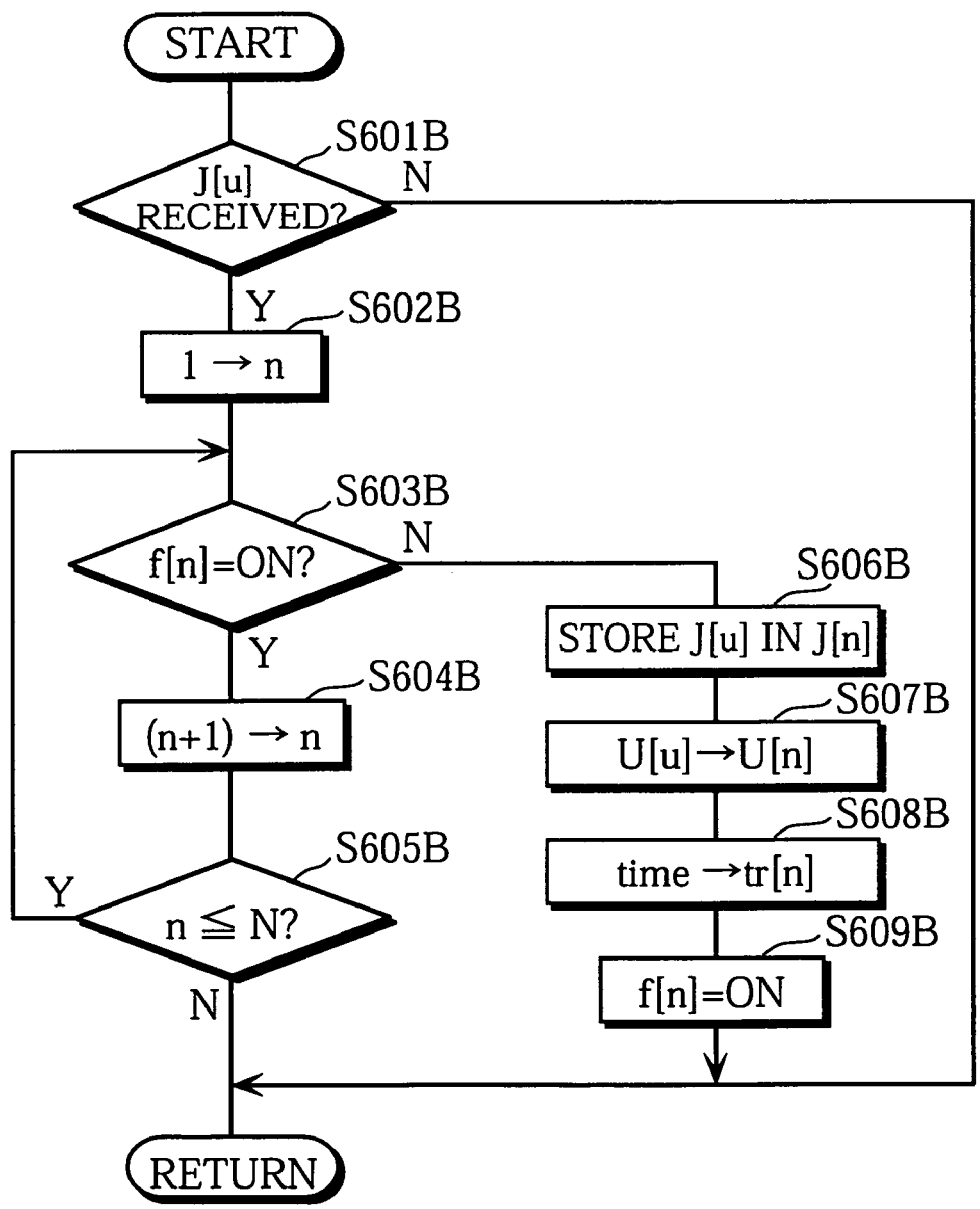
FIG. 31 is a flowchart showing a subroutine for processing for receiving a print job shown in step S600B of FIG. 30.

FIG. 31 is a flowchart showing a subroutine for the print job reception processing shown in FIG. 30 (step S600B). First, the print job control unit 422B judges whether a print job J[u] has been received (step S601B). If a print job J[u] has not been received at step S601B (S601B, N), control returns to the main routine of FIG. 30.

If a print job J[u] is received at step S601 (step S601B, Y), the print job control unit 422B searches the buffer numbers 1 to N in the buffer 421B shown in FIG. 25 from the lowest buffer number, for a buffer number corresponding to a vacant storage area (flag f[n] is OFF) (step S602B to S605B). If a vacant storage area is found (step S603B, N), the print job control unit 422B stores the received print job J[u] in this storage area (step S606B), in correspondence with a transmission origin terminal number u (Step S607B), and stores a time received from the timer 430B as the job reception time tr (step S608B). Then, the print job control unit 422B sets the flag f[n] for the storage area at ON (step S609B), and control returns to the main routine shown in FIG. 30. By repeating the above processing, the print job control unit 422B can store print jobs received from the terminals U1 to Uu in turn in buffer numbers corresponding to vacant storage areas in the buffer 421B. If there are no more vacant storage areas (step S605B, No), control returns to the main routine shown in FIG. 30, and the print job control unit 422B executes a print job retransmission request at step S850B in FIG. 30.

Figure 32:
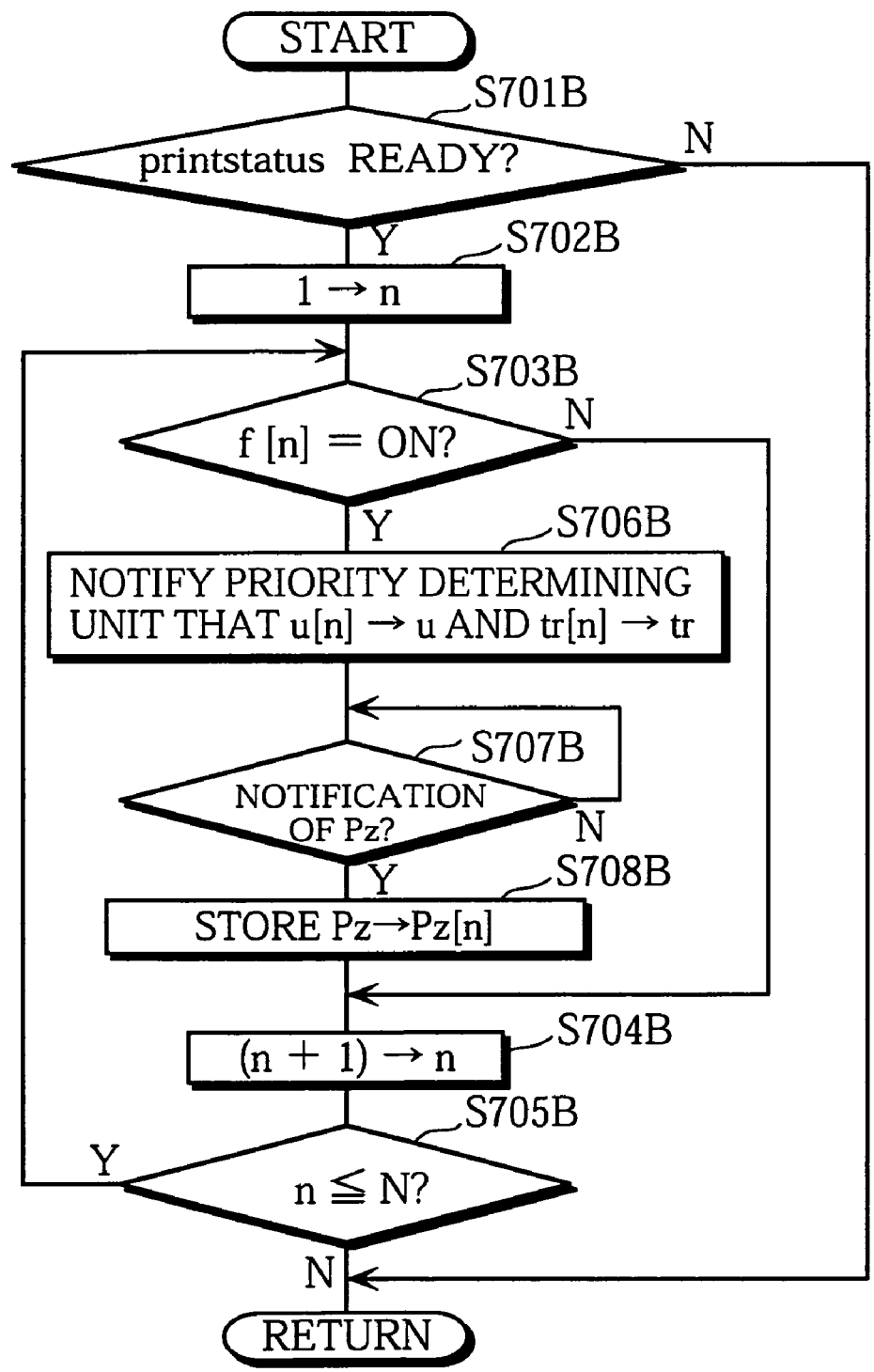
FIG. 32 is a flowchart showing a subroutine for processing for obtaining a priority level shown in step S600B of FIG. 30.

FIG. 32 is a flowchart showing a subroutine for the priority obtaining processing shown in step S700B of FIG. 30. The print job control unit 422B first judges whether a print status received from the printer interface 450B indicates that the printer 3 is available for printing (READY) (step S701B).

If the print status is not READY (i.e. BUSY) (step S701, N) the printer 3 is still in the process of printing the previously transmitted print job, so control returns to the main routine shown in FIG. 30.

If the print status is READY (step S701B, Y), the printer 3 is ready for printing, and the print job control unit 422B searches storage areas from buffer numbers 1 to N in the buffer 421 that are storing unprocessed print jobs (flag f[n] is ON) in turn from the area with the lowest buffer number (steps S702B, S703B, S704B, and S705B). Once a storage area in which an unprocessed print job has been stored is found (step S703B, Y), the print job control unit 422B informs the priority determining unit 440B of the transmission origin terminal number u and the job reception time tr stored in the found storage area (step S706B). Then, the print job control unit 422B waits to be informed of a priority level, in other words a piece of print indicating information Pz, by the priority determining unit 440B (step S707B).

Figure 33:
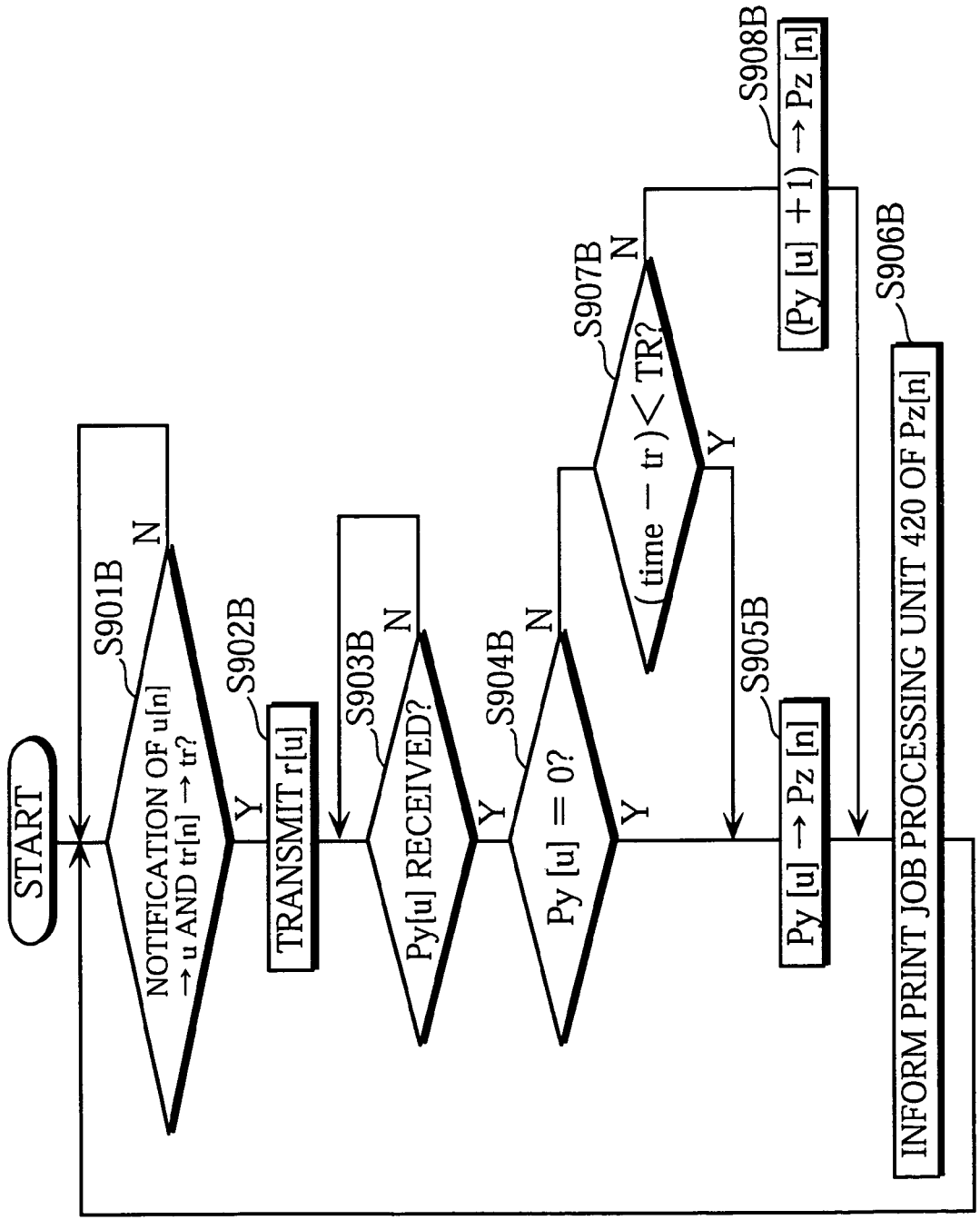
FIG. 33 is a flowchart showing processing for determining priority levels executed by a priority determining control unit 445B in the fourth embodiment.

FIG. 33 is a flowchart showing priority determining processing performed by the priority determining control unit 445B. The priority determining control unit 445B waits to be informed of a transmission origin terminal number u and a job reception time tr[n] by the print job control unit 422B (step S901B).

Having received the transmission origin terminal number u and the job reception time tr[n] (step S901B, Y), the priority determining control unit 445B stores these items respectively in the transmission origin terminal number storage unit 441B and the job reception time storage unit 442B, and instructs the LAN interface 410B to transmit a piece of print indicating information r[u] to the terminal u (step S902B). Then, the priority determining control unit 445B waits to receive a piece of print indicating information Py from the LAN interface 401B in response to the piece of print indicating information r[u] (step S903B).

Having received a piece of print indicating information r[u] for a terminal Uu from the priority determining unit 440B, the LAN interface 410B transmits the piece of print indicating information r[u] to the terminal Uu and transmits a piece of print indicating information Py[u] received from the terminal Uu in response to the print indicating information r[u] to the priority determining unit 440B.

Having received the piece of print indicating information Py[u] from the LAN interface 410B (step S903B, Y), the priority determining control unit 445B stores the piece of print indicating information Py[u] in the print indicating information storage unit 443B, and then judges whether the piece of print indicating information Py[u] is '0' (step S904B).

If the piece of print indicating information Py[u] is '0' (step S904B, Y), the priority determining control unit 445B sets the priority level determined by the piece of print indicating information Py[u] as a piece of print indicating information Pz[n] (step S905B), and informs the print job processing unit 420B of the piece of print indicating information Pz[n] (step S906B) before returning to step S901B.

If the piece of print indicating information Py[u] is not '0' at step S904B (step S904B, N), in other words, if it is one of '1' to '3', the priority determining control unit 445B judges whether the difference between a current time received from the timer 430B and a job reception time tr stored in the job reception time storage unit 442B, that is an elapsed time during which a print job has remained unprocessed (current time-tr), is less than a threshold time TR (step S907B).

If the elapsed time is less than the threshold time TR (step S907B, Y), the priority determining control unit 445B, in the same way as for when the priority level is '0', sets the piece of print indicating information Py as the piece of print indicating information Pz[n] without alteration (step S905B), and informs the print job processing unit 420B of the piece of print indicating information Pz[n] (step S906B), before returning to step S901B.

However, if the unprocessed time is at least as great as the threshold time (step S907, N), the priority determining control unit 445B increments the piece of print indicating information Py[u] by 1, and sets the incremented value as the print indicating information Pz[n] (step S908B). Then, the priority determining control unit 445B informs the print job processing unit 420B of the print indicating information Pz[n] (step S906B), and control returns to step S901B. The reason for this is that when an operator is operating a keyboard or similar of a particular terminal U1 to Uu, the priority level of a print job that has already been transmitted to the printer server S by that terminal is low. Consequently, it takes a long time for this print job to be printed, and the operator of the terminal is placed at a disadvantage. Here, if the unprocessed time is at least as great as the threshold time TR, the priority determining control unit 445B raises the priority level by 1, thereby speeding up processing of this print job.

To return to FIG. 32, having been informed of the piece of print indicating information Pz by the priority determining control unit 440B (step S707B, Y), the print job control unit 422B stores the piece of print indicating information Pz in a corresponding area Pz[n] (step S708B).

Each time a storage area in which an unprocessed print job is stored is found (step S703B, Y), the print job control unit 422B executes steps S706B to S708B, so a piece of print indicating information Pz is found for each unprocessed print job stored in buffer numbers 1 to N in the buffer 421B shown in FIG. 25.

The following is a explanation of the print job transmission processing executed by the print job control unit 422B.

Figure 34:
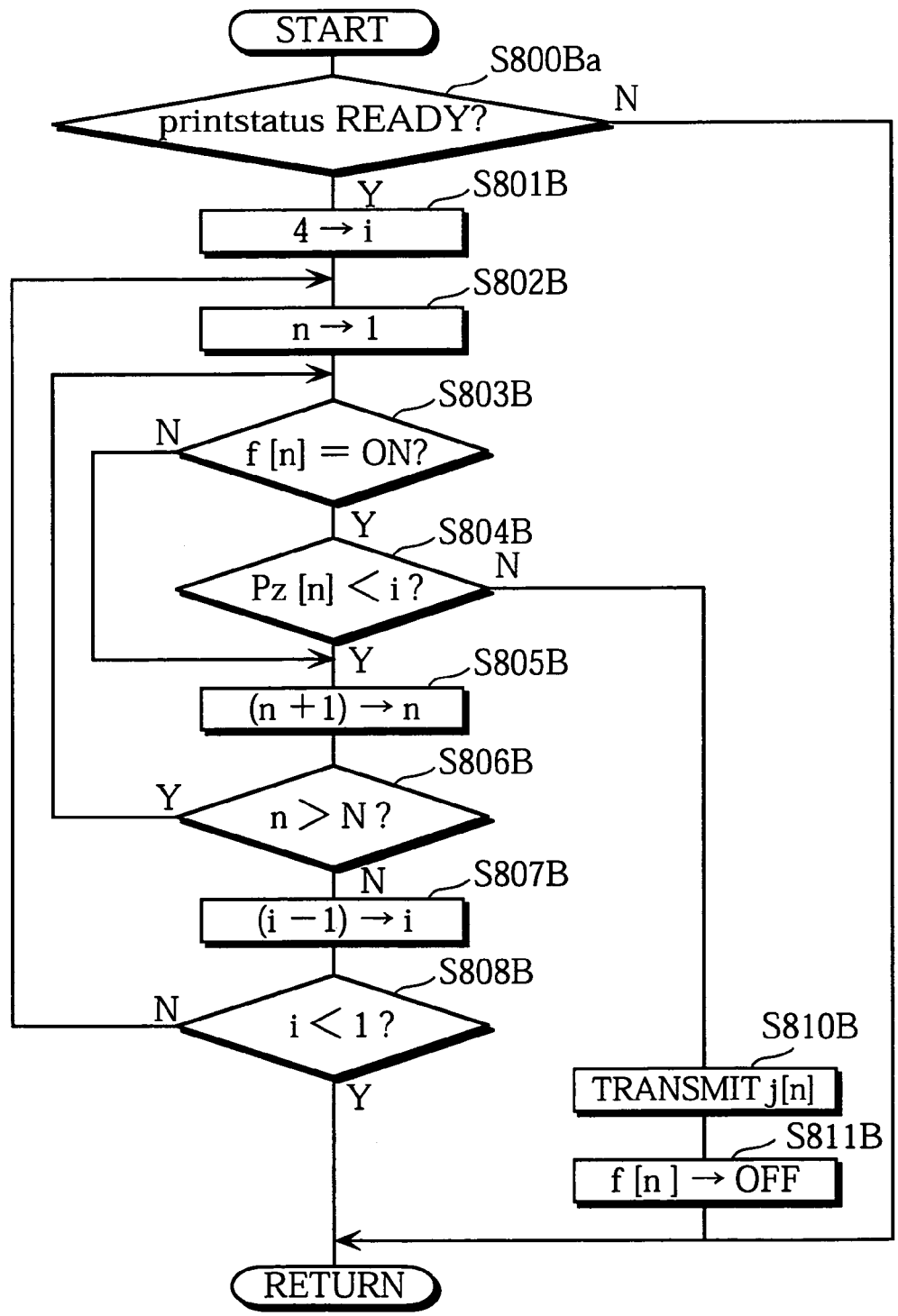
FIG. 34 is a flowchart showing a subroutine for processing for transmitting a print job shown in step S800B of FIG. 30.

FIG. 34 is a flowchart showing a subroutine for performing print transmission processing shown in FIG. 30 (step S800B).

The print job control unit 422B first judges whether a print status READY has been received from the printer interface 450B (step S800Ba). If the print status is not READY (step S800Ba, N), control returns to the main routine.

If the print status is READY (step S820B, Y), the print job control unit 422B sets a priority level i that is to be searched for at '4' (step S801B), and searches for storage areas in which unprocessed print jobs have been stored (flag f[n] is ON) from among the buffer numbers 1 to N in the buffer 421B shown in FIG. 25, the search being performed from the lowest buffer number (step S802B, S803B, S804B, S805B, and S806B). If an unprocessed print job with a priority level of '4' cannot be found in the buffer numbers 1 to N (step S806B, N), the print job control unit 422B decrements the priority level i that is to be searched for by 1 (step S807B). Then, provided that the priority level i is at least '1' (step S808B), the print job control unit 422B performs a search for storage areas in which unprocessed print jobs with the relevant priority level have been stored (flag f[n] is ON) from among the buffer numbers 1 to N, in turn from the lowest buffer number.

Having found a storage area for an unprocessed print job with a highest priority level i (step S804B, N), the print job control unit 422B transmits the print job to the printer interface 450B (step S810B). This means that the processing order of the print jobs can be optimized. Then, the print job control unit 422B sets the flag f[n] for the storage area in which the print job is stored to OFF (step S811B), making the storage area available for storing a new print job.

The printer interface 450B transmits a print job received from the print job processing unit 420B to the printer 3B.

In this embodiment of the invention, the terminals U1 to Uu transmit print jobs and take a piece of print indicating information Px set by an operator as a basis for a piece of print indicating information Py. The priority level of a piece of print indicating information Py is raised by 1 to '2' or '3' when the non-operational time tku reaches the threshold time TK1. On the other hand, when the operator operates the keyboard or similar, the priority level of a piece of print indicating information Py that had been raised to '2' or '3' is lowered to the original priority level shown in the print indicating information Px. When a terminal U1 to Uu receives a piece of print indicating information r, a current piece of print indicating information is transmitted. In response, the printer server S stores print jobs received from the terminals U1 to Uu in the buffer 421. Once the print status indicates that the printer 3B is available (READY), the printer server S transmits a piece of print indicating information r to the terminal that transmitted the unprocessed print job, and having received a piece of print indicating information Py in response, finds the print job with the highest priority level from among competing print jobs, according to the received piece of print indicating information Py, and instructs the printer 3B to print this print job.

Consequently, the non-operational time for terminals whose operators are operating a keyboard, mouse or the like in order to create a next print job is short, and print jobs from such terminals are given a low priority level. On the other hand, the operational time for terminals whose operators have stopped operating the keyboard or mouse, and left the place where the terminal is situated is long, and print jobs for such terminals have a high priority level. Therefore, situations in which print jobs for operators who have left their seats and are in a hurry to receive the printed document are dealt with after print jobs for operators who are still at their seats and in no particular hurry can be prevented. Furthermore, when the print status changes from BUSY to READY, the printer server S immediately transmits a piece of print indicating information r to the priority determining unit 440B. Therefore, when pieces of print indicating information Py are received from the terminals U1 to Uu, a piece of print indicating information Pz for each print job determined, and a next print job to be processed is found by the print job control unit 422B, there is very little possibility that the pieces of print indicating information for the terminals U1 to Uu will change. As a result, optimization of the processing order of print jobs can be performed with great accuracy.

Figure 35:
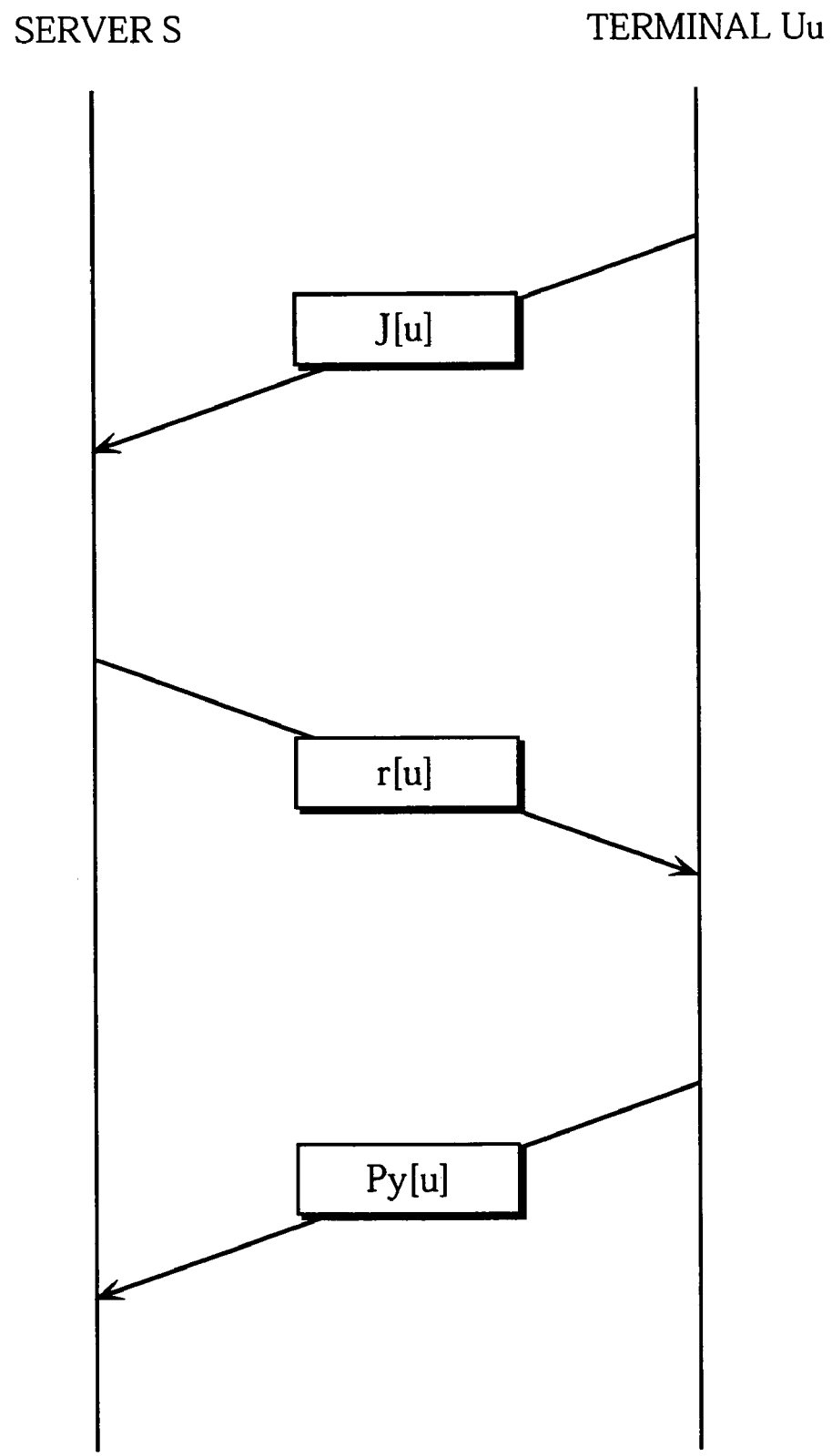
FIG. 35 is a sequence diagram showing a communications procedure performed between the terminal $U_U$ and the printer server S in the fourth embodiment.

A communication sequence performed between a terminals Uu and the printer server S is shown in FIG. 35. In the drawing, the terminal Uu transmits a print job. Once the print status of the printer server S changes to READY, the printer server S transmits a piece of print indicating information r to the terminal Uu that has transmitted an unprocessed print job. The terminal Uu may only transmit a piece of print indicating information Py when a piece of print indicating information r has been received. Therefore, if the above method is used, terminals no longer need to transmit operation information so frequently to the printer server S, and the communication load placed on the network is greatly reduced.

The above explanation of the invention is made based on various embodiments, but the invention need not be limited to these, and the following modifications are also possible.

1. In the first embodiment, print jobs that have been received from the printer server TU0 a certain time TRS or more previously are given a priority level that is a status value to which 1 has been added. However, the status may be used without alteration as the priority level, regardless of the time that has expired since a print job was received.

2. When a plurality of print jobs with the same priority level exist in the first embodiment, the print job stored in a storage area with a lowest buffer number is selected as the next print job to be processed. This means that a next print job to be processed from among print jobs with a same priority level is selected regardless of the order in which the print jobs were received by the printer server TU0. However, when a plurality of print jobs with the same priority level exist, selection need not be limited to such a method, and may be performed by referring to the reception times tr in the print job buffer 431 (FIG. 4), and selecting the print job with the earliest reception time tr as the next print job to be processed.

3. In the first embodiment, priority levels are set based on the non-operational time of each terminal, and the next print job to be processed is selected by referring to the priority levels. However, when a plurality of print jobs are waiting to be processed, selection may alternatively be made by referring to elapsed times tk in the status table 441 (FIG. 5), in other words, times indicating the length of a period during which non-operation has continued, and selecting the print job from the terminal whose non-operational state has continued for the longest period.

4. In the printer system of the first and second embodiments, a personal computer is used as a printer server, but a specialized printer server may be used instead. Alternatively, a printer may be used instead of the personal computer (printer server), this being a printer compatible with the network, that is a printer with an internal printer server.

5. In the first and second embodiments, when an input is not made into an input means such as a keyboard or mouse for a specified time, the operator is assumed to have left their seat, in other words not to be present at the terminal. Alternatively, detection processing may be performed to determine whether the operator is actually in front of the terminal or not.

A photosensor formed from a light source such as a light-emitting diode or a semiconductor laser, and a detection device such as a photodiode may be used as a human detecting device, and one of these human detecting devices allocated to each terminal to detect whether an operator is present or not.

Detection may be performed at set intervals of say 5 minutes, and if an operator is detected, existence information 'seated' may be generated instead of the operation information 'key' in the above embodiments. Then, subsequent processing may be performed in the same way as in the embodiments, with the existence information 'seated' replacing the operation information 'key'.

6. In the third embodiment, the priority level for print jobs that were received from the printer server TU0A at least a specified time TRS previously was changed by being raised by 1 from the priority level set by the terminal issuing the print job. However, in order to remain faithful to the basic principle of this invention, namely that print jobs from a terminal with a high priority level, determined by the amount of time that has passed since the most recent print job was received from that terminal, are given preference when performing print processing, this process of raising the priority level need not be performed.

Consequently, the priority changing unit 15A need not be used, and priority levels from the priority storage table 131A may be stored in the priority storage area in the print job buffer 141A without alteration. In order to realize this, the print job processing unit 14A outputs only the terminal number p stored in the storage area for the buffer number n to the priority setting unit 13A, at step S32A in the flowchart of FIG. 19. Then, the processing of step S32A and of the flowchart in FIG. 20 is omitted, and at step S34A in FIG. 19, the priority setting unit 13A reads a priority level corresponding to the terminal number p input by the print job processing unit 14A from the priority storage table 131A, and outputs the read priority level to the print job processing unit 14A.

7. In the third embodiment, when there are a plurality of print jobs with the same priority level, the print job stored in a storage area corresponding to a lowest buffer number is selected as the next print job to be processed. In other words, when there are a plurality of print jobs with the same priority level, the next print job to be processed is selected regardless of the order in which the print jobs were received by the printer server TU0. Alternatively, when a plurality of print jobs with a same priority level exist, the reception times tr in the print job buffer 141A (FIG. 17) may be referred to, and the print job with the earliest reception time tr selected as the next print job to be processed.

As a result, when a plurality of print jobs from a same terminal are waiting to be processed, print processing will be executed first on the print job that was first received by the print server TU0A.

8. In the third embodiment, the next print job to be processed is determined by referring to priority levels that are set at various values according to the length of time that has passed since a most recent print job was received from a particular terminal. Alternatively, when a plurality of print jobs are waiting to be printed, the elapsed times tk in the priority storage table 131A may be referred to, and a print job from a terminal with a longest elapsed time tk selected as the next print job to be processed.

9. The printer system in the third embodiment uses a personal computer as the printer server, but a specialist printer server machine may be used instead.

Alternatively, a network-compatible printer, in other words a printer with an internal printer server, may be used instead of a personal computer.

10. In the fourth embodiment, a same piece of print indicating information Px is set for all applications, but a different piece of print indicating information Px may be set for each application.

11. In the fourth embodiment, a piece of print indicating information Py is generated based on a piece of print indicating information Px and a piece of operation information 'key', but the piece of print indicating information Py may be generated based only on the piece of operation information 'key'. In addition, a piece of print indicating information is generated in the printer server S based on a piece of print indicating information Py and an elapsed time (current time—tr), but the piece of print indicating information Py may be used as the piece of print indicating information Pz without any alteration.

12. In the fourth embodiment, the next print job to be printed is determined in order from a print job with a lowest buffer number, regardless of reception time, but alternatively may be determined in order from a print job with a highest reception time.

13. In the fourth embodiment, the printer server S is constructed from a personal computer externally connected to a printer 3B, but may be formed from an external specialist printer server, or a network-compatible printer with an internal network interface adapter. In this case, the network interface adapter inside the printer fulfils the function of a printer server.

14. In the fourth embodiment, an operator is judged as being away from their seat, that is not at the terminal, when an input has not be made to an input means such as a keyboard or mouse for a specified time. Alternatively, a check may be performed to determine whether the operator is actually at the terminal or not.

A check is performed to determine whether the operation is at the terminal or not using a human detecting device, a reflective photosensor including a light source such as a light-emitting diode or a semiconductor laser, and a detecting device such as a photodiode, this human detecting device being installed at each terminal.

Detection may be performed at fixed intervals of say 5 seconds, and if an operator is detected, a piece of existence information 'seated' is generated instead of a piece of operation information 'key', and this piece of existence information 'seated' used to perform the processing described in the fourth embodiment.

15. The fourth embodiment is applied to a printer, but may also be applied to other image producing apparatuses such as digital copiers, FAX machines, microreader printers, and devices that are combinations thereof.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A printer controller that receives print jobs transmitted from a plurality of terminals, and instructs a printer to perform print processing, the printer controller comprising:
    a detector that detects pieces of operation information, each relating to a user's current manual operation of one of the plurality of terminals;
    a priority determining unit that determines priority levels for a plurality of print jobs waiting to be printed, a priority level of a print job determined based on a piece of operation information detected by the detector from a terminal that transmitted the print job;
    a controller that instructs the printer to process the plurality of print jobs in an order based on the determined priority levels;
    wherein the detector detects, as the piece of operation information, a non-operational period during which the terminal has not been operated; and
    wherein the priority determining unit sets higher priority levels for print jobs from terminals with longer non-operational periods.

2. The printer controller of claim 1, wherein the priority determining unit sets a higher priority level for (a) a print job from a terminal with a non-operational period that exceeds a specified value than for (b) a print job from a terminal with a non-operational period that is no more than the specified value.

3. The printer controller of claim 1, wherein the detector detects each of the pieces of operation information based on a signal transmitted from each terminal, each signal being generated when an input device for a terminal is operated.

4. The printer controller of claim 1, further comprising:
    an elapsed time measuring unit for measuring an elapsed time since each print job was received,
    wherein the priority determining unit changes the priority level of a print job when a corresponding measured elapsed time exceeds a specified value.

5. An image forming apparatus that receives print jobs transmitted from a plurality of terminals, and performs print processing, the image forming apparatus comprising:
    an image forming unit that performs print processing corresponding to the received print jobs;
    a detector that detects pieces of operation information, each relating to a user's current manual operation of one of the plurality of terminals;
    a priority determining unit that determines priority levels for a plurality of print jobs waiting to be printed, a priority level of a print job determined based on a piece of operation information detected by the detector from a terminal that transmitted the print job;
    a controller that instructs the image forming unit to process the plurality of print jobs in an order based on the determined priority levels;
    wherein the detector detects, as the niece of operation information, a non-operational period during which the terminal has not been operated; and
    wherein the priority determining unit sets higher priority levels for print jobs from terminals with longer non-operational periods.

6. The image forming apparatus of claim 5, wherein the detector detects each of the pieces of operation information based on a signal transmitted from each terminal, each signal being generated when an input device for a terminal is operated.

7. The image forming apparatus of claim 5, further comprising:
    an elapsed time measuring unit for measuring an elapsed time since each print job was received,
    wherein the priority determining unit changes the priority level of a print job when a corresponding measured elapsed time exceeds a specified value.

8. A terminal that transmits print jobs to a printer controller controlling a printer shared with a plurality of other terminals, the terminal comprising:
    a receiving unit that receives a print job input by an operator;
    a timer that measures an elapsed time since an input device that includes the receiving unit was last operated; and
    a transmission controller that transmits the input print job after waiting for the timer to measure a specified time.

9. A printer controller that receives print jobs transmitted from a plurality of terminals, and controls a printer to perform print processing, the printer controller comprising:
    at least one detector that detects whether an operator is in a vicinity of each terminal;
    a priority determining unit that determines priority levels for a plurality of print jobs waiting to be printed, a priority level of a print job determined based on a detection result produced by the at least one detector for a terminal that transmitted the print job; and
    a controller that controls the printer so that the plurality of print jobs are processed in an order based on the determined priority levels.

10. A printer controller that receives print jobs transmitted from a plurality of terminals, and instructs a printer to perform print processing, the printer controller comprising:
    memory that stores each of the received print jobs in correspondence with information indicating a transmission origin terminal for each print job;
    a first timer that measures an elapsed time since reception of a most recent print job from each terminal;
    a priority determining unit that determines a priority level for each terminal according to the measured elapsed times since reception of the most recent print job from each terminal; and
    a controller that instructs the printer to process the plurality of print jobs stored in the memory in an order based on the determined priority levels.

11. The printer controller of claim 10, wherein the priority determining unit sets a higher priority level for (a) a print job from a terminal with an elapsed time exceeding a specified value than for (b) a print job from a terminal with an elapsed time no more than the specified value.

12. The printer controller of claim 10, wherein the priority determining unit sets higher priority levels for print jobs from terminals with longer elapsed times.

13. The printer controller of claim 10, further comprising:
    a second timer that measures an elapsed time since each print job was received, wherein the plurality determining unit changes the priority level of a print job when a corresponding measured elapsed time exceeds a specified value.

14. An image forming apparatus for receiving print jobs from a plurality of terminals, the image forming apparatus comprising:
- an image forming unit that performs print processing corresponding to the received print jobs;
- memory that stores each received print job in correspondence with information indicating a transmission origin terminal for each print job;
- a first timer that measures an elapsed time since a print job was last received from each terminal;
- a priority determining unit that determines a priority level for each terminal according to the measured elapsed times since a print job was last received from each terminal; and
- a controller that instructs the image forming unit to process the plurality of print jobs stored in the memory in an order based on the determined priority levels.

15. The image forming apparatus of claim 14, wherein the priority determining unit sets a higher priority level for (a) a print job from a terminal with an elapsed time exceeding a specified value than for (b) a print job from a terminal with an elapsed time no more than the specified value.

16. The image forming apparatus of claim 14, wherein the priority determining unit sets higher priority levels for print jobs from terminals with longer elapsed times.

17. The image forming apparatus of claim 14, further comprising:
- a second timer that measures an elapsed time since each print job was received,
- wherein the priority determining unit changes the priority level of a print job when a corresponding measured elapsed time exceeds a specified value.

18. A printer controller that receives print jobs transmitted from a plurality of terminals, and controls a printer to perform print processing, the printer controller comprising:
- memory that stores each of the received print jobs in correspondence with information indicating a transmission origin terminal;
- a transmission control unit that transmits a request signal requesting transmission of a piece of print processing information for a print job to the transmission origin terminal; and
- a controller that receives the piece of print processing information transmitted from the terminal that received the request signal, and controls the printer so as to perform print processing of the job, based on the received piece of print processing information,
- wherein the piece of print processing information relates to a current manual operation state of the transmission origin terminal;
- wherein the niece of print processing information is a piece of processing priority information indicating a processing priority level of a print job.

19. The printer controller of claim 18, wherein the piece of processing priority information is input by an operator into a terminal input device.

20. The printer controller of claim 18, wherein the piece of print processing information relates to a user's current operation of the transmission origin terminal.

21. The printer controller of claim 18, wherein the piece of processing priority information is generated according to an amount of time during which an operator has not operated a terminal.

22. The printer controller of claim 18, wherein the transmission control unit transmits the request signal when the printer is available to process a new print job.

23. An image forming apparatus that receives print jobs transmitted from a plurality of terminals, and performs print processing, the image forming apparatus comprising:
- an image forming unit that performs print processing corresponding to the print jobs;
- memory that stores each of the received print jobs in correspondence with information indicating a transmission origin terminal;
- a transmission control unit that transmits a request signal requesting transmission of a piece of print processing information to a transmission origin terminal of a print job stored in the memory; and
- a controller that receives the piece of print processing information transmitted from the terminal that received the request signal, and controls the image forming unit so as to perform print processing of the print job, based on the received piece of print processing information,
- wherein the piece of print processing information relates to a current manual operation state of the transmission origin terminal;
- wherein each piece of print processing information is a piece of processing priority information indicating a processing priority level of a print job.

24. The image forming apparatus of claim 23, wherein the transmission control unit transmits the request signal when the printer is available to process a new print job.

25. The image forming apparatus of claim 23, wherein the piece of print processing information relates to a user's current operation of the transmission origin terminal.

26. A terminal that transmits print jobs to a printer controller, the terminal comprising:
- an information generating unit that generates a piece of print processing information indicating processing of a print job that has already been transmitted to the printer controller;
- a reception control unit that receives a request signal requesting the transmission of the piece of print processing information from the printer controller; and
- a transmission control unit that transmits the piece of print processing information generated when the request signal is received, in response to the request signal;
- wherein the piece of print processing information relates to a current manual operation state of the terminal;
- wherein the piece of print processing information is a piece of processing priority information indicating a processing priority level of a print job.

27. The terminal of claim 26, wherein the piece of print processing information relates to a user's current operation of the terminal.

* * * * *